(12) United States Patent
Shimachi et al.

(10) Patent No.: US 8,033,897 B2
(45) Date of Patent: Oct. 11, 2011

(54) METHOD FOR COLLECTING USEFUL PORTIONS OF FISH HEADS AND DEVICE FOR COLLECTING USEFUL PORTIONS OF FISH HEAD

(75) Inventors: Shigeyuki Shimachi, Iwate (JP); Akira Hashimoto, Iwate (JP); Yoshihiro Hagihara, Iwate (JP); Katsuo Tashiro, Iwate (JP)

(73) Assignee: Marutatsu Kamasui Co., Ltd, Iwate (JP)

( * ) Notice: Subject to any disclaimer, the term of this patent is extended or adjusted under 35 U.S.C. 154(b) by 0 days.

(21) Appl. No.: 12/295,257

(22) PCT Filed: Sep. 29, 2006

(86) PCT No.: PCT/JP2006/319536
§ 371 (c)(1),
(2), (4) Date: Oct. 5, 2009

(87) PCT Pub. No.: WO2007/116545
PCT Pub. Date: Oct. 18, 2007

(65) Prior Publication Data
US 2010/0048115 A1    Feb. 25, 2010

(30) Foreign Application Priority Data
Mar. 31, 2006  (JP) .................................. 2006-098805

(51) Int. Cl.
*A22C 18/00*    (2006.01)
(52) U.S. Cl. ...................................... 452/149
(58) Field of Classification Search ............. 452/64, 452/149, 152, 157, 160–163, 170, 182, 183
See application file for complete search history.

(56) References Cited

U.S. PATENT DOCUMENTS

| | | | | |
|---|---|---|---|---|
| 4,531,261 | A | * | 7/1985 | Sanaka .............................. 452/1 |
| 4,583,265 | A | * | 4/1986 | Kristinsson ................... 452/155 |
| 4,601,083 | A | * | 7/1986 | Shoji et al. ....................... 452/64 |
| 5,106,334 | A | | 4/1992 | Kristinsson |
| 5,458,535 | A | * | 10/1995 | Bullock et al. ................... 452/64 |
| 5,628,680 | A | * | 5/1997 | Hjorth ............................ 452/106 |
| 6,019,675 | A | | 2/2000 | Berg |
| 6,347,986 | B1 | | 2/2002 | Fujii |
| 6,361,426 | B1 | * | 3/2002 | Kragh ............................ 452/161 |

FOREIGN PATENT DOCUMENTS

| | | | |
|---|---|---|---|
| JP | 5-252861 | A | 10/1993 |
| JP | 6-153774 | A | 6/1994 |
| JP | 6-339337 | A | 12/1994 |
| JP | 2001-501099 | A | 1/2001 |
| WO | 00/35959 | A1 | 6/2000 |

* cited by examiner

*Primary Examiner* — Thomas Price
(74) *Attorney, Agent, or Firm* — Sughrue Mion, PLLC

(57) ABSTRACT

Useful portions in the fish heads W are collected from a number of fish heads W of the same kind of fish and of roughly same shape, pituitaries M. A useful portion line is preliminarily determined which passes pituitaries M as useful portions of the number of fish heads W having different sizes when the fish heads W are rested in a specific posture, and each of fish heads W to be processed is rested in the specific posture, and the rested fish head W is cut in the vicinity of the preliminarily determined useful portion line substantially along the useful portion line to expose an useful portion, and a brain as an untargeted portion which is present in a cut surface F is removed to expose the pituitary M, and the exposed pituitary M is collected.

30 Claims, 14 Drawing Sheets

METHOD FOR COLLECTING USEFUL PORTIONS OF FISH HEADS AND DEVICE FOR COLLECTING USEFUL PORTIONS OF FISH HEAD

TECHNICAL FIELD

The present invention relates to a technique to beneficially utilize heads of various kinds of fish such as salmon, trout, tuna, bonito, yellowtail, carp, cat fish and the like, which are mostly disposed of as fishery waste. In particular, the present invention relates to a method for collecting useful portions of fish heads and a device for collecting useful portions of fish heads, which collect specific useful portions from a number of fish heads of the same kind of fish.

BACKGROUND ART

In general, most parts of fish heads are disposed of as waste. For example, description will be given on salmon heads, nasal cartilage of a salmon head has been commercialized in the form of so-called "namasu (vinegared or marinated slices of salmon nasal cartilage)". However, most other parts of the salmon head have been disposed of.

In this connection, fish heads include useful portions such as head cartilage, portions around eyes, brain, pituitary gland (hypophysis) containing growth (somatotropic) hormone and genadotropic hormone, and the like. Techniques to utilize useful substances contained in such useful portions have been being developed.

When such useful portions are collected, for example, pituitaries (hypophyses) rich in growth hormone and genadotropic hormone are collected, there has generally been employed in a laboratory or the like a method which comprises manually cutting a fish head with, for example, a cooking knife, visually locating a pituitary (hypophysis), and collecting the pituitary. Further, there has been tried a method which comprises cutting out a pituitary-containing portion with a cylindrical cutting blade in the direction from a dorsal portion of a fish head to a lower jaw of the fish head, and manually extracting the pituitary from the cut out portion. Moreover, there has been employed, but rarely, a method which comprises removing branchiae from a fish head to expose a mouth and throat of a fish head, and then manually cutting out a pituitary-containing portion with a cylindrical cutting blade in the direction opposite to the above-described direction, i.e., the direction from the exposed throat of the fish head to a dorsal portion of the fish head.

Furthermore, there has heretofore been known a technique to automatically take out useful portions from fish heads although this is not such a technique to collect pituitaries as described above. As the technique to automatically take out useful portions from fish heads, for example, a technique disclosed in Patent Document 1 has been known.

This is a technique to take out nasal cartilage from fish heads which comprises cooking or steaming fish heads to soften the fish heads, placing the fish heads in a rotating mesh drum, rotating the rotating drum to apply impactive force to the fish heads and to thereby expel the residual matter other than the nasal cartilage through the mesh, and taking out the nasal cartilage from the rotating drum. The nasal cartilage is utilized as a starting material for extraction of chondroitin sulfate, and the residual matter is used as a feed or the like.

Further, as a technique to automatically take out useful portions from fish heads, for example, a technique disclosed in Patent Document 2 has also been known.

This is a technique to collect orbital fat (corps adiposum orbitae) from fish heads W, as shown in FIG. 16, in which a conveyer 100 for transferring the fish heads W with their mouths oriented toward the transfer direction is provided, and holders 101 for holding the fish heads W are disposed on the conveyer 100, and a pipe-like extracting blade 102, which has such an inner diameter that blade covers orbits (eye sockets) and which has its tip edged, is placed on one side of the fish heads W held by the holders 101, and the extracting blade 102 is thrust through a fish head W which is transferred to collect eyes together with the surrounding thereof from the fish head W.

Patent Document 1: Japanese Unexamined Patent Publication
Patent Document 2: Japanese Unexamined Patent Publication No. Hei 6 (1994)-153774

DISCLOSURE OF INVENTION

Problems to be Solved by the Invention

However, fish heads have different sizes even in the same kind of fish. For example, in the case of salmon, large fish heads are likely to have sizes about two times as large as those of small fish heads. Further, the sizes are also different between male and female. As described above, fish heads have individual differences in size even in the same kind of fish. Accordingly, in the manual methods of the above-described conventional collecting methods, it is difficult to locate target useful portions. In particular, when an amount of a useful portion obtained from one fish head is small as in the case of pituitary, accuracy of the cutting or cutting out is poor and variable, and the useful portion is likely to be damaged or broken during cutting or cutting out to give rise to a problem of poor certainty in the collection. Further, in the collecting method which comprises cutting out a target-containing portion, there is a problem that since an untargeted portion other than the useful portion is collected together with the useful portion, the subsequent separating operation is cumbersome. Moreover, in the manual methods, there is a problem that a large number of fish heads cannot be processed in a short time.

On the other hand, in the automatically collecting method disclosed in each of the above-mentioned Patent Documents, speeding up of the collecting operation is realized. However, for example, although the technique to take out nasal cartilage in Patent Document 1 is suitable for taking out nasal cartilage, the technique has a problem in that when it is intended to extract components contained in useful portions other than nasal cartilage, since the useful portions are contained in the residual matter, the subsequent separating operation for extracting the components of the useful portions is cumbersome.

In the technique in Patent Document 2, the useful portion is located to some extent and collected. However, since eyes of fish heads are collected together with a portion around them, an untargeted portion other than the useful portion is collected concurrently as in the case of the collecting method comprising manual cutting out, causing a problem that the subsequent separating operation is cumbersome.

The present invention has been made in view of the above-described problems. It is, therefore, an object of the present invention to provide a method for collecting useful portions of fish heads and a device for collecting useful portions of fish heads which permit substantially only specific useful portions of fish heads to be surely collected to thereby realize improved efficiency of collection of the useful portions.

Means to Solve the Problems

To achieve the above object, the present inventors have made intensive and extensive studies, and they have focused attention on the point that as far as the same kind of fish is concerned, fish heads have similar figures although the fish heads have individual differences in size. As a result, they have contrived a method for collecting useful portions of fish heads and a device for collecting useful portions of fish heads of the present invention which are capable of surely collecting substantially only specific useful portions from a number of fish heads of the same kind of fish substantially irrespective of sizes of the fish heads, so long as the fish heads are those of the same kind of fish and of roughly the same shape.

As a method for collecting useful portions of fish heads according to the present invention which is for attaining the above-described object, there is provided a method for collecting useful portions of fish heads, the method collecting specific useful portions from a number of fish heads of the same kind of fish and of roughly the same shape, the method comprising:

preliminarily determining a useful portion line which passes useful portions of a number of fish heads having different sizes when the fish heads are rested in a specific posture;

resting the a fish head to be processed in the specific posture;

cutting the rested fish head along the preliminarily determined useful portion line or cutting the rested fish head in the vicinity of the preliminarily determined useful portion line substantially along the useful portion line to expose the useful portion(s); and subsequently collecting the exposed useful portion.

According to this, when a fish head to be processed is cut, the fish head which has been rested is cut along the predetermined useful portion line or in the vicinity of the predetermined useful portion line substantially along the useful portion line. By virtue of this cutting, a useful portion present on the useful portion line is exposed. In this connection, the predetermined useful portion line is a line which is obtained by resting a number of fish heads having different sizes in a specific posture and which passes useful portions of the fish heads. Accordingly, when the fish head is cut based on the useful portion line, the fish head can surely be cut directly through a position where the useful portion is present or the vicinity thereof substantially irrespective of a size of the fish head. By virtue of this, substantially only the specific useful portion can be surely collected.

If the useful portion is still covered with an untargeted portion after the cutting, the untargeted portion is preferably removed to expose the useful portion, as occasion demands. Mainly in the case where the fish head which has been rested is cut in the vicinity of the predetermined useful portion line substantially along the useful portion line, the untargeted portion is likely to remain. However, since the cut surface is present in the vicinity of the useful portion, an amount of the untargeted portion to be removed is small. By virtue of this, the useful portion can be exposed with ease.

The useful portion of the fish head may be is a specific organ of the fish head which is present on a center plane that is orthogonal to an eye-eye line segment connecting both eyes of the fish head and that passes the middle of the eye-eye line segment. The specific organ may be at least one of a brain and a pituitary (hypophysis).

Specifically, as shown in FIGS. 1 to 3, in the case where the specific organ as the useful portion is at least one of a brain N and a pituitary M, since the brain N and the pituitary M are present on the center plane S which is orthogonal to the eye-eye line segment Q connecting both eyes 1,1 of the fish head W (see FIG. 3) and which passes the middle of the eye-eye line segment Q, it is preferred that in the determination of the useful portion line P, when each of a number of fish heads W having different sizes is placed in such a manner that the center plane S of each of the fish heads W is located at the same position and a craniocaudal axis of each of the fish heads W is substantially equally oriented, a group of a plurality of curved surfaces K, which are fixed relative to the center plane S and contact with all the fish heads W to rest each of the fish heads W thereon, are selected, and a contour of a brain enclosure 2 of each of the fish heads which have been brought in contact with and rested on the selected group of curved surfaces K is recorded to obtain a group of the contours of the brain enclosures 2, and a line which passes through the group of the contours of the brain enclosures 2 and contained in the center plane S is determined as the useful portion line. In this connection, the brain enclosure 2 is a brain-containing space in a skull, and the space is hereinafter referred to as "brain enclosure".

More particularly, as shown in FIG. 1, several curved surfaces K fixed to a base V, which are also fixed relative to the center plane S, are referred to as a group of fish head holding curved surfaces. The group of fish head holding curved surfaces are appropriately set, and the group of curved surfaces and each of a number of fish heads W having different sizes are brought in contact with each other, a position and a posture of each of the fish heads W are thereby statically determined. In consequence, a position and a posture of a brain enclosure 2 of the fish head W are also determined relative to the group of fish head holding curved surfaces. With respect to various kinds of fish, when each of a number of fish heads W (including heads of male and female individuals) having different sizes is introduced between the group of fish head holding curved surfaces to bring the fish head W in contact with the group of fish head holding curved surfaces, the brain enclosures 2 of the fish heads W are located at different positions. Accordingly, if these positions are recorded, a group of contours of the brain enclosures is obtained. If the group of fish head holding curved surfaces are appropriately set, a useful portion line P which passes through the group of contours of the brain enclosures can be found. According to the present invention, each of fish heads is cut along the useful portion line or cut in the vicinity of the useful portion line P substantially along the useful portion line P.

As shown in FIG. 4, the useful portion line P may be a straight line, as the occasion arises. By virtue of the advantage that the useful portion line P is a straight line, the useful portion line P can be specified with ease relative to the fish heads, facilitating the cutting.

When the kind of fish is salmon, the useful portion line may be a straight line at an angle of $\theta=16\pm5$ degrees to a straight line passing two specific points determined on a ridge line of the fish head, as occasion demands. In the case of salmon, such a useful portion line can be found.

More particularly, as shown in FIG. 4, it is preferred that when the kind of fish is salmon, and when as parts of the group of a plurality of curved surfaces, which are fixed relative to the center plane and contact with all the fish heads to rest each of the fish heads thereon, the following three fixed points A, B and C are set in the center plane in such a manner that the fixed point A is located at a snout-proximal position on the ridge line, i.e., upper outline of the fish head, and the fixed point B is located on the ridge line, i.e., upper outline of the fish head and 70 mm±10 mm apart from the fixed point A in a caudal direction, and the fixed point C is so located on a lower outline of the fish head that when a point D is so set on a straight line $W_a$ passing the two fixed points A and B as to be a snout-proximal symmetrical point of the fixed point B with respect to the fixed point A as a center of symmetry, and a foot of the perpendicular drawn from the fixed point C to the straight line $W_a$ is present at the midpoint E between the fixed point A and the symmetrical point D, and the fixed point C is located 55 mm±5 mm perpendicularly apart from the straight line $W_a$ passing the fixed points A and B and on the lower outline of the fish head, the useful portion line P is a straight line which is at an angle of $\theta=16\pm5$ degrees to the straight line $W_a$ passing the fixed points A and B and which passes the fixed point D, as occasion demands.

Further, as shown in FIG. 2, the cut surface F may be a (curved) surface T (including a plane surface) which is mirror-symmetrical with respect to the center plane S, as occasion arises.

As shown in FIG. 2, in general, a tissue structure of a fish head W is mirror-symmetrical with respect to a plane which is perpendicular to a line segment (an axis) connecting both eyes 1, 1 and which includes a spine, i.e., with respect to the central plane S. The useful portion line P described above in relation to the group of contours of brain enclosures is present on the mirror surface. When the cut surface of the fish head is symmetrical with respect to the mirror surface, so long as a mechanism for extracting matter in a brain enclosure is kept in the mirror surface of symmetry, the mechanism is permitted to arrive at the brain enclosure 2 only by moving the mechanism in the craniocaudal direction while pressing the mechanism against the cut surface of the fish head. This enables the extraction mechanism to be simple. The cutting blade of the fish head cutting mechanism cuts the fish head generating a curved cut line, and the curved cut line depicts the (curved) surface T with respect to the fish head space as the cutting mechanism is operated to provide the cut surface of the fish head. By cutting the fish head in such a manner that the cut surface of the fish head passes in the vicinity of the useful portion line described above in relation to the group of contours of brain enclosures, the brain enclosure of the fish head can be exposed irrespective of the kind of fish.

As a device for collecting useful portions of fish heads according to the present invention which is for attaining the above-described object, there is provided a device for collecting useful portions of fish heads, the device collecting specific useful portions from a number of fish heads of the same kind of fish and of roughly the same shape, the device comprising:

a posture regulating mechanism for regulating a posture of a fish head to be processed based on a preliminarily determined useful portion line which passes useful portions of a number of fish heads having different sizes when the fish heads are rested in a specific posture, thereby holding the fish head in the specific posture;

a cutting mechanism for cutting the posture-regulated fish head along the preliminarily determined useful portion line or cutting the posture-regulated fish head in the vicinity of the preliminarily determined useful portion line substantially along the useful portion line to expose the useful portions; and a collecting mechanism for collecting a useful portion of the fish head which is exposed by the cutting and which is present on the useful portion curve.

According to this device, when a useful portion is collected from a fish head, a posture of the fish head to be processed is regulated by the posture regulating mechanism, and the fish head to be processed is cut by the cutting mechanism. In the cutting, the fish head is cut along the predetermined useful portion line or cut in the vicinity of the predetermined useful portion line substantially along the useful portion line. Based on the cutting, the useful portion present on the useful portion line is exposed. In this connection, the predetermined useful potion line is a line which is obtained by resting a number of fish heads having different sizes in a specific posture and which passes useful portions of the fish heads. Accordingly, the fish head can surely be cut directly through a position where the useful portion is present or the vicinity thereof substantially irrespective of a size of the fish head. By virtue of this, substantially only a specific useful portion alone can surely be collected.

As occasion demands, the device may comprise an exposing mechanism for removing an untargeted portion from the fish head subsequent to the cutting to thereby expose the useful portion. Mainly in the case where the fish head is cut in the vicinity of the predetermined useful portion line substantially along the useful portion line, the untargeted portion is likely to remain. However, since the cut surface is present in the vicinity of the useful portion, an amount of the untargeted portion to be removed is small. By virtue of this, the useful portion can be exposed with ease.

Further, as occasion calls, the device may comprise a transfer mechanism which is provided with grasping mechanisms each for grasping the posture-regulated fish head in the posture regulating mechanism and which takes out the fish head from the posture regulating mechanism and transfers the fish head in such a condition that the fish head is grasped by the grasping mechanism, and the cutting mechanism and the collecting mechanism are disposed on a transfer course of the transfer mechanism.

The transfer of fish heads by the transfer mechanism enables each of the cutting of a fish head and the collection of a useful portion to be performed in succession, thereby surely realizing automation.

Moreover, in the case where the device comprises the transfer mechanism, the cutting mechanism, the exposing mechanism and the collecting mechanism may be disposed on the transfer course of the transfer mechanism. The transfer of fish heads by the transfer mechanism enables each of the cutting of a fish head, the removal of an untargeted portion and the collection of a useful potion to be performed in succession, thereby surely realizing automation.

The useful portion of the fish head may be a specific organ present on a center plane which is orthogonal to an eye-eye line segment connecting both eyes of the fish head and passes the middle of the eye-eye line segment. The specific organ may be at least one of a brain and a pituitary (hypophysis).

In the case where the specific organ is at least one of brain and pituitary (hypophysis), as described above, it is effective thatin the determination of the useful portion line P, when each of a number of fish heads having different sizes is placed in such a manner that the center plane of each of the fish heads is located at the same position and a craniocaudal axis of each of the fish heads is substantially equally oriented, a group of a plurality of curved surfaces, which are fixed relative to the center plane and contact with all the fish heads to rest each of the fish heads thereon, are selected, and a contour of a brain enclosure of each of the fish heads brought in contact with and rested on the selected group of curved surfaces is recorded to obtain a group of the contours of the brain enclosures, and a line which passes through the group of the contours of the brain enclosures and contained in the center plane is determined as the useful portion line. In this case, in the device for collecting useful portions of fish heads of the present invention, the posture regulating mechanism includes a base and a plurality of abutment members which are mounted on the base and which respectively correspond to the group of curved surfaces on which each of the fish heads abuts, thereby holding the fish head.

According to this, since the posture of the fish head is regulated only by allowing the fish head to abut upon the abutment members, the posture regulating operation can be performed with ease. By virtue of this, operational efficiency is improved as compared with a case where a position of a fish head is measured by a sensor or the like point by point, and improved processing efficiency can be realized.

As already described above, as shown in FIG. 4, the useful portion line P may be a straight line, as the occasion arises. By virtue of the advantage that the useful portion line P is a straight line, the useful portion line P can be specified with ease relative to the fish heads, thereby facilitating and the cutting.

When the kind of fish is salmon, the useful portion line may be a straight line at an angle of θ=16±6 degrees to a straight line passing two specific points determined on a ridge line of the fish head, as occasion demands. In the case of salmon, such a useful portion line can be found.

More particularly, as shown in FIG. 4, it is preferred that when the kind of fish is salmon, and when as parts of the group of a plurality of curved surfaces, which are fixed relative to the center plane and contact with all the fish heads to rest each of the fish heads thereon, the following three fixed points A, B and C are set in the center plane in such a manner that the fixed point A is located at a snout-proximal position on the ridge line, i.e., upper outline of the fish head, and the fixed point B is located on the ridge line, i.e., upper outline of the fish head and 70 mm±10 mm apart from the fixed point A in a caudal direction, and the fixed point C is so located on a lower outline of the fish head that when a point D is so set on a straight line $W_a$ passing the two fixed points A and B as to be a snout-proximal symmetrical point of the fixed point B with respect to the fixed point A as a center of symmetry, and a foot of the perpendicular drawn from the fixed point C to the straight line $W_a$ is present at the midpoint E between the fixed point A and the symmetrical point D, and the fixed point C is located 55 mm±5 mm perpendicularly apart from the straight line $W_a$ passing the fixed points A and B and on the lower outline of the fish head, the useful portion line P is a straight line which is at an angle of θ=16±5 degrees to the straight line $W_a$ passing the fixed points A and B and which passes the fixed point D, as occasion demands.

Further, as occasion arises, the cut surface may be a (curved) surface (including a plane surface) which is mirror-symmetrical with respect to the center plane. As described above, with respect to the cutting mechanism, the cutting blade of the fish head cutting mechanism cuts the fish head generating a curved cut line, and the curved cut line depicts the (curved) surface T with respect to the fish head space as the cutting mechanism is operated to provide the cut surface of the fish head, although the cut line and the (curved) surface T are changed according to conditions of the cutting blade. By cutting the fish head in such a manner that the cut surface of the fish head passes in the vicinity of the useful portion line described above in relation to the group of contours of brain enclosures, the brain enclosure of the fish head can be exposed irrespective of the kind of fish.

Moreover, as occasion calls, the useful portion of the fish head may be a pituitary which is present on the center plane that is orthogonal to an eye-eye line segment connecting both eyes of the fish head and that passes the middle of the eye-eye line segment and which is present in a Turkish saddle located in a skull and dorsal-proximally contiguous to a brain; and the cutting mechanism is provided with a cutting blade for cutting the posture-regulated fish head in the vicinity of the preliminarily determined useful portion curve substantially along the useful portion curve to remove a dorsal portion of the fish head in such a manner that the cut surface is a (curved) surface which is mirror-symmetrical with respect to the center plane, and the exposing mechanism is for removing an untargeted portion from the fish head after the cutting to expose the pituitary, and the collecting mechanism is for collecting the pituitary exposed by the exposing mechanism; and the exposing mechanism includes a spatula which is advanced in a dorsoventral direction of the fish head toward the cut surface of the fish head and thereby elastically pressed against the cut surface and which is moved in a snout-to-tail direction, i.e., rostral-to-caudal direction of the fish head while being elastically pressed against the cut surface to scratch off a brain attached to a skull and to thereby expose the pituitary in a Turkish saddle in the skull, and a driving section which advances and horizontally moves the spatula; and the collecting mechanism includes a suction nozzle which is advanced toward the Turkish saddle to suck the pituitary exposed from the Turkish saddle, and a driving section which advances the suction nozzle.

By virtue of this, the spatula of the exposing mechanism is advanced following the cut surface of the skull and a wall of the brain enclosure to scratch off the brain in the brain enclosure, and the pituitary is thereby exposed from the Turkish saddle. In this connection, since the cut surface is present in the vicinity of the pituitary, an amount of the brain as the untargeted portion to be removed is small. This enables the useful portion to be exposed with ease. In a word, based on the above-described cutting, the pituitary as the useful portion present on the useful portion line can surely be exposed with ease.

Further, the nozzle 61 is advanced toward the Turkish saddle and brought into contact with or inserted into the Turkish saddle to perform suction. In this connection, since the pituitary as a useful portion present on the useful portion line has surely been exposed based on the above-described cutting, substantially only the pituitary as a specific portion can surely be collected. By virtue thereof, only the pituitary containing no substantial untargeted portion other than the pituitary can be collected, thereby leading to extremely high efficiency.

Moreover, as occasion demands, the useful portion of the fish head may be a pituitary which is present on the center plane that is orthogonal to an eye-eye line segment connecting both eyes of the fish head and that passes the middle of the eye-eye line segment and which is present in a Turkish saddle located in a skull and dorsal-proximally contiguous to a brain; and the device further comprises a transfer mechanism; and the transfer mechanism is provided with grasping mechanisms each for grasping the posture-regulated fish head in the posture regulating mechanism and takes out the fish head from the posture regulating mechanism and transfers the fish head in such a condition that the fish head is grasped by the grasping mechanism, the cutting mechanism is disposed on a transfer course of the transfer mechanism and is provided with a cutting blade for cutting the posture-regulated fish head in the vicinity of the preliminarily determined useful portion curve substantially along the useful portion curve to remove a dorsal portion of the fish head in such a manner that the cut surface is a (curved) surface mirror-symmetrical with respect to the center plane, and the exposing mechanism is disposed on the transfer course of the transfer mechanism and is for removing an untargeted portion from the fish head after the cutting to expose the pituitary, and the collecting mechanism is disposed on the transfer course of the transfer mechanism and is for collecting the pituitary exposed by the exposing mechanism; and the exposing mechanism includes a spatula which is advanced in a dorsoventral direction of the fish head toward the cut surface of the fish head transferred and stopped by the transfer mechanism and which is thereby elastically pressed against the cut surface and which is moved in a snout-to-tail-direction, i.e., rostral-to-caudal direction of the fish head while being elastically pressed against the cut surface to scratch off a brain attached to a skull and to thereby expose the pituitary in a Turkish saddle in the skull, and a driving section which advances and horizontally moves the spatula; and the collecting mechanism includes a suction nozzle which is advanced toward the Turkish saddle to suck a pituitary exposed from the Turkish saddle, and a driving section which advances the suction nozzle.

Furthermore, as occasion demands, the device may comprise a transfer mechanism which is provided with grasping mechanisms each for grasping a ventral portion, i.e., lower portion of the posture-regulated fish head in the posture regulating mechanism and which takes out the fish head from the posture regulating mechanism and transfers the fish head in such a condition that the fish head is grasped by the grasping mechanism; and the transfer mechanism includes arms which have a rotating shaft perpendicular to their longitudinal directions at their proximal ends and which are rotated about the rotating shaft, and a driving section for rotating the arms; and the grasping mechanisms are each so constructed as to grasp the ventral portion, i.e., lower portion of the fish head and are respectively mounted on the distal ends of the arms so as to transfer the fish head in such a manner that the craniocaudal axis of the grasped fish head is moved along the rotational direction of the arms. The transfer mechanism is constructed into a so-called turret type and is thereby compact, enabling size reduction of the device to be realized.

Further, as a device for collecting useful portions of fish heads according to the present invention which is for attaining the above-described object, there is provided a device for collecting useful portions of fish heads, said device collecting specific useful portions from a number of fish heads of the same kind of fish and of roughly the same shape, wherein the useful portion of the fish head is a pituitary which is present on a center plane that is orthogonal to an eye-eye line segment connecting both eyes and that passes the middle of the eye-eye line segment and which is present in a Turkish saddle located in a skull and dorsal-proximally contiguous to a brain, the device comprising:

a cutting mechanism provided with a cutting blade for cutting the fish head to remove a dorsal portion of the fish head in such a manner that the brain is exposed from the skull;

an exposing mechanism for removing the brain from the fish head subsequent to the cutting to expose the pituitary; and a collecting mechanism for collecting the pituitary exposed by the exposing mechanism.

According to this, when the pituitary is collected from the fish head, first, a dorsal portion of the fish head is cut off by the cutting mechanism in such a manner that the brain is exposed from the skull. This cutting is not restricted to the cutting based on the useful portion line as described above, and may be such cutting that the posture of the fish head is appropriately kept and the fish head is appropriately cut so as to expose the brain from the skull. Then, the brain is removed by the exposing mechanism to expose the pituitary. Thereafter, the pituitary is collected by the collecting mechanism. Since the pituitary is surely exposed by the exposing mechanism after the cutting, substantially only the pituitary as a specific organ can surely be collected. By virtue of this, only the pituitary containing no substantial untargeted portion other than the pituitary can be collected, leading to extremely high efficiency.

In this case, it is effective that the exposing mechanism includes a spatula which is advanced in a dorsoventral direction of the fish head toward the cut surface of the fish head and thereby elastically pressed against the cut surface and which is moved in a snout-to-tail direction, i.e., rostral-to-caudal direction of the fish head while being elastically pressed against the cut surface to scratch off a brain attached to a skull and to thereby expose the pituitary in a Turkish saddle in the skull, and a driving section which advances and horizontally moves the spatula; and wherein the collecting mechanism includes a suction nozzle which is advanced toward the Turkish saddle to suck the pituitary exposed from the Turkish saddle, and a driving section which advances the suction nozzle.

According to this, the spatula of the exposing mechanism is moved following the cut surface of the skull and a wall surface of the brain enclosure, and the brain in the brain enclosure is thereby scratched off to expose the pituitary from the Turkish saddle. In this connection, only by performing the cutting in such a manner that the brain is exposed, the brain can be scratched off by the spatula. In addition, bonding of the brain is weak and thus the brain is easy-to-detach. Accordingly, the brain can be removed with ease to expose the pituitary. Subsequently, the nozzle is advanced toward the Turkish saddle and brought into contact with or inserted into the Turkish saddle to perform suction. Accordingly, only the pituitary containing no substantial untargeted portion other than the pituitary can surely be collected, thereby leading to extremely high efficiency.

Further, as a device for collecting useful portions of fish heads according to the present invention which is for attaining the above-described object, there is provided a device for collecting useful portions of fish heads, the device comprising:

a cutting mechanism for cutting a fish head;

an exposing mechanism for exposing a useful portion of the fish head; and a collecting mechanism for collecting the useful portion exposed by the exposing mechanism; the exposing mechanism including a spatula which is moved while being pressed against a cut surface of the fish head, and a driving section which advances and moves the spatula; and the collecting mechanism including a suction nozzle for sucking the useful portion, and a driving section which advances the suction nozzle.

According to this, the spatula of the exposing mechanism is moved following the cut surface of the skull and a wall surface of the brain enclosure, and the brain in the brain enclosure is thereby scratched off to expose the pituitary from the Turkish saddle. In this connection, only by performing the cutting in such a manner that the brain is exposed, the brain can be scratched off by the spatula. In addition, bonding of the brain is weak and thus the brain is easy-to-detatch. Accordingly, the brain can be removed with ease to expose the pituitary. Subsequently, the nozzle is advanced toward the Turkish saddle and brought into contact with or inserted into the Turkish saddle) to perform suction. Accordingly, only the pituitary containing no substantial untargeted portion other than the pituitary can surely be collected, thereby leading to extremely high efficiency.

The useful portion may be a pituitary which is present on a center plane that is orthogonal to an eye-eye line segment connecting both eyes of the fish head and that passes the middle of the eye-eye line segment and which is present in a Turkish saddle located in a skull and dorsal-proximally contiguous to a brain.

According to this, when the pituitary is collected from the fish head, the brain is removed by the exposing mechanism to expose the pituitary. Thereafter, the pituitary is collected by the collecting mechanism. Since the pituitary is surely exposed by the exposing mechanism, substantially only the pituitary as a specific organ can surely be collected. By virtue of this, only the pituitary containing no substantial untargeted portion other than the pituitary can be collected, leading to extremely high efficiency.

The spatula may be advanced in a dorsoventral direction of the fish head toward the cut surface of the fish head and thereby elastically pressed against the cut surface and moved in a snout-to-tail direction, i.e., rostral-to-caudal direction of the fish head while being elastically pressed against the cut surface to scratch off a brain attached to a brain enclosure and to thereby expose the pituitary in a Turkish saddle.

The suction nozzle may be advanced toward the Turkish saddle to suck the pituitary exposed from the Turkish saddle.

The device may comprise a cutting mechanism provided with a cutting blade for cutting the fish head to remove a dorsal portion of the fish head in such a manner that the brain is exposed from the skull of the fish head.

EFFECT OF THE INVENTION

According to the method for collecting useful portions of fish heads and the device for collecting useful portions of fish heads of the present invention, a specific useful portion of each of fish heads can be collected with ease by the cutting, and yet, so long as the fish heads are those of the same kind of fish and of roughly the same shape, each of the fish heads can surely be cut directly through a position where the useful portion is present or in the vicinity of the position substantially irrespective of the size of the fish head, and thus the exposure of the useful portion is facilitated to enable substantially only the specific useful portion to be surely collected. By virtue of this, useful portion collecting efficiency is greatly improved.

According to the device for collecting useful portions of fish heads of the present invention, when a pituitary is collected from each of fish heads by cutting off a dorsal portion of the fish head by the cutting mechanism in such a manner that a brain is exposed from a skull, removing the brain by the exposing mechanism to expose the pituitary, and collecting the pituitary by the collecting mechanism, the cutting is not restricted to the cutting based on the useful portion line, and if cutting is performed in such a manner that a posture of the fish head is appropriately kept and the fish head is appropriately cut so as to expose the brain from the skull, the brain is then removed by the exposing mechanism to expose the pituitary, and the pituitary is collected by the collecting mechanism. Since the pituitary is thereby surely exposed, substantially only the pituitary as a specific organ can surely be collected. By virtue of this, collecting efficiency can be improved.

BEST MODE FOR CARRYING OUT THE INVENTION

In the following, the method for collecting useful portions of fish heads and the device for collecting useful portions of fish heads according to embodiments of the present invention will be described in detail with reference to the accompanying drawings.

In the first place, the method for collecting useful portions of fish heads according to an embodiment of the present invention will be described.

The method for collecting useful portions of fish heads according to the embodiment of the present invention is a method which collects specific useful portions from a number of fish heads W of the same kind of fish and of roughly the same shape, as shown in FIGS. 1 to 5, and in particular, which collects pituitaries (hypophyses) M as specific organs, i.e., useful portions from fish heads W of chum salmon as the kind of fish.

As shown in FIGS. 3 and 4, a fish head W has a skull 3 which protects a brain N surrounded by a large amount of adipose tissue by providing a brain enclosure 2. A pituitary M is present in a cavity called as "Turkish saddle (sella turcica) 4" which is located on a center plane S that is orthogonal to an eye-eye line Q connecting both eyes 1, 1 of the fish head W and that passes the middle of the eye-eye line Q, and which is ventrally contiguous to the brain enclosure 2 at a nose-proximal position of a bottom of the cerebral 2. The pituitary M joins to and suspends from a lower portion of an intermediate part between a cerebrum and mesencephalon (midbrain),i.e., an infundibulum (a funnel-shaped portion) between a saccus vasculosus and a chiasma opticum. Since the joint is weak, when the brain N is moved, the pituitary M is easily disjoined and remains in the Turkish saddle 4.

In this collecting method, a useful portion line P is first determined which passes useful portions of a number of fish heads W having different sizes when the fish heads W are rested in a specific posture or in a predetermined positional relationship.

More particularly, as shown in FIGS. 1 to 3, in the determination of the useful portion line P, when each of a number of fish heads W having different sizes is placed in such a manner that a center plane S of each of the fish head W is located at the same position and a craniocaudal axis of each of the fish head W is oriented in substantially the same direction, a group of a plurality of curved surfaces K, which are fixed relative to the center plane S and contact with all the fish heads W to rest each of the fish heads W thereon, are selected, and a contour of a brain enclosure 2 of each of the fish heads W brought in contact with and statically rested on the selected group of curved surfaces K is recorded to obtain a group of the contours of the brain enclosures 2, and a line which passes through the group of the contours of brain enclosures and contained in the center plane S is determined as the useful portion line P.

Further particularly, as shown in FIG. 4, a number of fish heads W of salmon (including male and female individuals) which have different sizes are provided, and the fish heads W are cut along the center plane S. Three small circles $K_a(1)$ to $K_a(3)$ as constituents of the group of curved surfaces K are employed. A profile of each of the fish heads W is moved to be brought in contact with the small circles in such a manner that an upper contour of the fish head W (a ridgeline of the fish head W) on the center plane S contacts with the two small circles $K_a(1)$ and $K_a(2)$ on the center plane S and a (ventral) contour of a lower jaw contacts with the other small circle $K_a(3)$ on the center plane S. When the contour of each of the fish heads W on the center plane S is brought in contact with the three small circles $K_a(1)$ to $K_a(3)$ (which are curves fixed relative to the center plane S), a position and an inclination of the profile contour are determined. Such points that radii of these circles $K_a(1)$ to $K_a(3)$ are brought infinitely close to zero are regarded as positions of the circles. These points are set to be such three fixed points that a fixed point A is located at a snout-proximal position on the upper contour of the fish head W, and a fixed point B is located on the upper contour of the fish head W and 70 mm±10 mm (70 mm: in the embodiments) caudally apart from the fixed point A, and a fixed point C is so located that it is 55 mm±5 mm (55 mm: in the embodiments) perpendicularly apart from a straight line $W_a$ passing the fixed points A and B and that a distance from the fixed point A to a foot E of a perpendicular drawn from the fixed point C to the straight line $W_a$ (midpoint E between A and D described below) is 35 mm±5 mm (35 mm: in the embodiments).

A number of fish heads W have been examined and studies have been made thereon, as a result, it has been found that when a point D is so set on the straight line $W_a$ passing both the fixed points A and B as to be 70 mm distant from the fixed point A (length of AD=70 mm) and 140 mm distant from the fixed point B (length of BD=140 mm), i.e., as to be a snout-proximal symmetrical point of the fixed point B with respect to the fixed point A as a center of symmetry, pituitaries M are present substantially in a row on a straight line (P) which passes the symmetrical point D and which is at an angle of θ=about 16 degrees to the straight line $W_a$ passing both the fixed points A and B, irrespective of individual differences. In other words, it has been found that in the case where the kind of fish is salmon, when each of fish heads W is rested in the center plane S on the fixed points A and B located on the ridgeline of the fish head W and the fixed point C located on the lower contour of the fish head W, a straight line at an angle of θ=16±5 degrees to the straight line $W_a$ passing both the fixed points A and B may be employed as a useful portion line P. In the embodiments, a straight line which passes the point D and which is at an angle of θ=16 degrees to the straight line $W_a$ passing both the fixed points A and B is determined as the useful portion line P.

As shown in FIG. 5, in the method for collecting useful portions of fish heads according to the embodiment, a fish head W to be treated is rested in a specific posture or a predetermined positional relationship (FIG. 5(a)), and the rested fish head W is cut along the preliminarily determined useful portion line P or the rested fish head W is cut in the dorsal vicinity of the preliminarily determined useful portion line P substantially along the useful portion line P. In the embodiment, each of the fish heads W is cut in the vicinity of the useful portion line P substantially along the useful portion line P. In general, each of the fish heads W is cut along a line Pa 10 mm±5 mm (10 mm: in the embodiment) spaced apart from the useful portion line P. The cutting position may arbitrarily be set so long as it is within practical allowance or acceptable accuracy.

A cut surface F resulting from the cutting is a (curved) surface T (including a plane surface) which is mirror-symmetrical with respect to the center plane S. In the cutting, as a cutting blade, various kinds of cutting blades such as a band saw blade, a rotary disc cutting blade, a rotary disc saw and the like may be used. The (curved) surface T may be a plane surface parallel to the useful portion line P (straight line) or a curved surface as shown in FIG. 2 depending on a shape of the cutting blade and/or a moving course of the cutting blade. In this connection, the (curved) surface T may be any one so long as it is a cut surface F resulting from cutting in the vicinity of the useful portion line P substantially along the useful portion line P.

By the cutting, which passes through a brain enclosure 2, a skull 3 is cut off together with an upper portion (a dorsal portion) of a brain N to expose the brain N, as shown in FIG. 5(b). In other words, by virtue of the cutting, the brain N can be exposed irrespective of a size of the fish head W.

Then, as shown in FIG. 5(c), the brain N remaining under the cut surface F is removed by an appropriate means such as scratching off, blowing off or the like because the brain N is an untargeted portion and an obstacle to collection of a pituitary M. The pituitary M is present in a recess contiguous to the bottom of the brain enclosure 2 which is called as "Turkish saddle (sella turcica) 4", and when the brain N is removed, the pituitary M is exposed. Since bonding of the brain N to the skull 3 is weak, the brain N is readily separated with a slight force. When the brain N is removed, the pituitary M is exposed from the Turkish saddle 4.

In other words, the preliminarily determined useful portion line P is a line which is obtained by resting a number of the fish heads W having different sizes in the specific posture or predetermined positional relationship and which passes a pituitary M of each of the fish heads W. Accordingly, by cutting each of the fish heads W in the vicinity of the preliminarily determined useful portion line P, the fish head W can surely be cut in the vicinity of a place where the pituitary M is present substantially irrespective of the size of the fish head W. By virtue of this, the brain N as an untargeted portion can easily be removed, and the pituitary M is thereby exposed with ease. In this connection, since the cut surface F is present adjacent to the pituitary M, an amount of the untargeted portion to be removed is small. This enables the useful portion to be exposed with ease. In a word, the pituitary M as a useful portion present on the useful portion line P can be surely exposed with ease based on the above-described cutting.

Thereafter, as shown in FIG. 5(d), the exposed pituitary M is collected by a an appropriate means such as suction or the like. In this case, the pituitary M as a useful portion present on the useful portion line P has surely been exposed owing to the above-described cutting. This enables substantially only the pituitary M as a specific organ to surely be collected. By virtue thereof, substantially only the pituitary M containing no substantial untargeted portion other than the pituitary M can be collected. This leads to extremely high collecting efficiency.

In the next place, the device for collecting useful portions of fish heads according to an embodiment of the present invention will be described in detail. The device for collecting useful portions of fish heads according to the embodiment of the present invention is a device for carrying out the method for collecting useful portions of the fish heads according to the above-described embodiment of the present invention, and as shown in FIGS. 6 to 10, the device basically comprises a posture regulating mechanism 10, a transfer mechanism 20, a cutting mechanism 40, an exposing mechanism 50, a collecting mechanism 60, and a fish head discharging mechanism 70.

The posture regulating mechanism 10 is a mechanism for regulating a posture of a fish head W to be processed based on the preliminarily determined useful portion line P which passes a pituitary M as a useful portion of each of a number of fish heads W having different sizes when the fish heads W are statically rested in the specific posture or predetermined positional relationship, as shown in FIGS. 6 to 8.

As described above, the useful portion line P in this case is a straight line which is at an angle of θ=16±5 degrees (in the embodiment: 16 degrees) to the straight line $W_a$ passing the fixed points A and B and which passes the point D (see FIG. 4).

As shown in FIGS. 7 and 8, the posture regulating mechanism 10 comprises a base 11 and a plurality of abutment members which are mounted on the base 11 and which respectively correspond to the above-described group of curved surfaces K and which permit a fish head W to abut thereon to hold the fish head W. The abutment members are so disposed as to permit the fish head W to be placed thereon with its snout down and as to hold the placed fish head W with its craniocaudal axis kept substantially vertical, and as the abutment members, there are employed a plate-like first abutment member 12 which includes the fixed points A and B and on which a ridgeline of the fish head W abuts and a second abutment member 13 which includes the fixed point C and on which a lower jaw of the fish head W abuts. The first abutment member 12 is left-right symmetrically provided with guide members 14 on the surface thereof, which lead the fish head when the fish head W is introduced with its snout down W so that the fish head W is allowed to abut on the abutment members 12 and 13.

The base 11 is also provided with a pressing member 15 above the second abutment member 13 for pressing a tail-proximal portion of the jaw of the fish head W. The pressing member 15 is pivotally mounted relative to the base 11 and is biased so as to press the fish head W toward the first abutment member 12 by a coil spring 16.

Further, there are provided two pairs of pressing members 17 for pressing the fish head W held by the abutment members 12 and 13 from right and left sides in order to hold the fish head W in such a posture that the center plane S of the fish head is perpendicular to the abutment members 12 and 13. Each pair of the pressing members 17 are so mounted pivotally on pivot shafts via supporting rods $17_a$ as to be approachable each other. Between supporting rods $17_a$ of each pair of the pressing members 17, a coil spring 18 is spanned for biasing the pressing members 17 in such directions that the pressing members 17 approach each other. At base-proximal ends of the supporting rods $17_a$ of each pair of the pressing members 17, respective spur gears 19 are provided which mesh with each other to permit the supporting rods $17_a$ to pivot in phase. The above-mentioned pressing plate 15 and pressing members 17 are so positionally controlled by stoppers (not shown) as to be placed in expanded arrangement which allows the fish head W to be introduced with its snout down, before the fish head W is introduced. In other words, the pressing plate 15 and pressing members 17 are such that when the fish head W is introduced with its snout down, the coil springs 16 and 18 are stretched by a weight of the fish head W and allow the fish head W to abut on the abutment members 12 and 13, and the fish head W are pressed by the pairs of the pressing members 17 which cooperate with each other by the pairs of the spur gears 19, and if the center plane S of the fish head W inclines, the fish head W received forces only from the pressing members 17 on one side and the inclination of the center plane S of the fish head W is rectified, and in consequence, the center plane S of the fish head W is put in a posture perpendicular to the abutment members 12 and 13.

As shown in FIG. 6, the transfer mechanism 20 comprises grasping mechanisms 30 each of which grasps a ventral portion (lower portion) of the fish head W having its posture regulated by the posture regulating mechanism 10, and the transfer mechanism 20 takes out the fish head W from the posture regulating mechanism 10 and transfers the fish head W in such a condition that the fish head W is grasped by the grasping mechanism 30.

The transfer mechanism 20 includes four arms 22 which have a rotating shaft 21 perpendicular to their longitudinal directions at their one ends (proximal ends) and which are rotated about the rotating shaft 21 and which are mounted at regular angular intervals (90 degrees) in a cross shape, and a driving section 23 which rotates the arms 22. The driving section 23 is equipped with a servo-motor (not shown) for rotating the arms 22 by an equiangular amount (90 degrees) in accordance with predetermined intermittent time intervals.

As shown in FIG. 6, with respect to four stop positions of tips (distal ends) of the arms 22, the posture regulating mechanism 10 is disposed corresponding to the first stop position, a cutting mechanism 40 is disposed corresponding to the next stop position in a rotational direction of the arms 22, an exposing mechanism 50 and a collecting mechanism 60 are disposed corresponding to the following stop position in the rotational direction of the arms 22, and a discharge mechanism 70 is disposed corresponding to the last stop position in the rotational direction of the arms 22.

In the transfer mechanism 20, the grasping mechanisms 30 are respectively provided on the other ends (distal ends) of the arms 22. As shown in FIG. 9, each of the grasping mechanisms 30 includes a pair of grasping hands 32 pivotally mounted on a base member 31 and are thereby openable/closable for grasping a lower portion (ventral portion) of the fish head W when the grasping mechanism 30 is closed, and a driving mechanism 33 for opening or closing the grasping hands 32. On a grasping surface of each of grasping pieces 32$a$ respectively provided at the tips (distal ends) of the grasping hands 32, a plurality of needles 37 are protrudingly provided which stick into the fish head W to ensure the grasp when the fish head W is grasped. The driving mechanism 33 is constructed into a ball thread mechanism 36 that includes a screw 34 which has a right-hand thread $34_a$ and a left-hand thread $34_b$ and which is forwardly/reversely rotated by a servo-motor (not shown), and a pair of slider blocks 35 with which the other ends (proximal ends) of the grasping hands 32 are engaged and which are respectively thread-engaged with the right-hand thread $34_a$ and the left-hand thread $34_b$ of the screw 34 and thereby moved. The grasping hands 32 are driven to open or close by such movements of the pair of slider blocks 35 that the slider blocks 35 are moved away from or close to each other by the forward/reverse rotation of the screw 34. The grasping mechanisms 30 are respectively mounted on the other (distal) ends of the arms 22 in such a manner that a perpendicular distance L between the center of rotation of the arms 22 and the useful portion line P of the fish head W grasped by the grasping mechanism 30 is constant (see FIG. 6), and that the grasped fish head W is transferred in such a manner that the craniocaudal direction or craniocaudal axis of the grasped fish head W is moved along the rotational direction.

As shown in FIG. 6, the cutting mechanism 40 is disposed on the transfer course of the transfer mechanism 20 and corresponding to the stop position subsequent to that of the posture regulating mechanism 10, and as shown in FIG. 2, the cutting mechanism 40 is provided with a cutting blade 41 for cutting the posture-regulated fish head W in the vicinity of the preliminarily determined useful portion line P substantially along the useful portion line P to form a cut surface F in the form of a (curved) surface T which is mirror-symmetrical with respect to the center plane S, thereby removing a dorsal portion of the fish head W.

As the cutting blade 41, for example, a rotary disc cutting blade which is driven to rotate by a motor (not shown), as shown in FIG. 6. As shown in FIG. 5($a$), the cutting blade 41 is so positioned as to cut the fish head W along a line Pa which is 10 mm apart from the useful portion line P. In other words, the cutting blade 41 is so positioned as to cut the fish head W at a position (L+10 mm) apart from the center of rotation of the arms 22 wherein L is the distance between the center of rotation of the arms 22 and the useful portion line P, and moved substantially along the useful portion line P to cut the fish head W, as shown in FIG. 5(b). The cutting position may arbitrarily be set so long as it is within practical allowance or acceptable accuracy. The cut surface F in the form of the (curved) surface T is a plane when the cutting blade 41 is disposed in parallel with the useful portion line P, and an cross-section of the (curved) surface T is an elliptical segment when the cutting blade 41 is moved with its rotational axis inclined with respect to the useful portion line P.

In the following, detailed description will be given on the exposing mechanism 50 and collecting mechanism 60 in a case where the cut surface F is in a horizontal condition. In this connection, the cut surface F may be put in a horizontal condition in an appropriate manner. For example, the grasping pieces 32a provided at the tips of the grasping hands 32 are rotated by 90 degrees subsequent to the cutting to put the cut surface F of the fish head W in the horizontal condition. It should be noted, however, that the condition of the cut surface F is not restricted to the horizontal condition and may be, for example, a vertical condition, an inclined condition or the like. For example, the fish head may be rotated by the arm in a condition as grasped and taken out from the posture regulating mechanism or may be turned by 90 degrees about the longitudinal direction of the arm and rotated by the arm in a condition as shown in FIG. 6. In such cases, the cut surface is in a vertical condition.

The exposing mechanism 50 and the collecting mechanism 60 are disposed on the transfer course of the transfer mechanism 20 and corresponding to the stop position subsequent to that of the cutting mechanism 40, as shown in FIG. 6.

As shown in FIG. 10, the exposing mechanism 50 is for removing an untargeted portion from the fish head W subsequent to the cutting to expose a pituitary M, and the exposing mechanism 50 includes a spatula 51 which is advanced from above the cut surface of the fish head W transferred and stopped by the transfer mechanism 20 and thereby elastically pressed against the cut surface F and which is horizontally moved in a snout-to-tail direction (rostral-to-caudal direction) of the fish head while being elastically pressed against the cut surface F to scratch off a brain N attached to a skull 3 and to thereby expose the pituitary M in a Turkish saddle in the skull 3, and a driving section 52 which advances and horizontally moves the spatula 51. The position of the spatula 51 from which the spatula is advanced is located over the cut skull 3, and by the horizontal movement of the spatula 51, the spatula 51 follows the cut surface F and a wall surface of a brain enclosure 2 to scratch off the brain N in the brain enclosure 2.

As shown in FIG. 10, the driving section 52 includes a vertically driving section 53 for vertically moving the spatula 51 when the fish head W is transferred and stopped by the transfer mechanism 20, and a horizontal driving section 57 for moving the spatula 51 in the craniocaudal direction (snout-to-tail direction) when the spatula 51 is elastically pressed against the cut surface F.

The vertically driving section 53 includes a vertical rod 55 which is advanced or retreated by a servo-motor and a ball screw mechanism as a driving source 54, and the spatula 51 is advanceably/retreatably mounted on the tip of the vertical rod 55 and biased in the advancing direction by a coil spring 56. By the advance of the vertical rod 55, the spatula 51 is elastically pressed against the cut surface F of the skull 3.

On the other hand, the horizontally driving section 57 includes a horizontal rod 59 which is advanced or retreated by a servo-motor and ball screw mechanism as a driving source 58. The horizontal rod 59 is connected to vertical rod 55 in such a manner that the vertical rod 55 is journaled by the horizontal rod 59 at a leading end of the horizontal rod 59 to allow the vertical rod 55 to advance or retreat, and the horizontal rod 59 is advanced or retreated to thereby horizontally advance or retreat the vertical rod 55, thereby moving the spatula 51.

As shown in FIG. 10, the collecting mechanism 60 is for collecting the pituitary M exposed by the exposing mechanism 50, and the collecting mechanism 60 includes a suction nozzle 61 which is advanced toward the Turkish saddle 4 to suck the pituitary M exposed by the exposing mechanism 50 from the Turkish saddle 4, and a driving section 62 which advances the suction nozzle 61. The suction nozzle 61 may be advanced to an appropriate extent which facilitates the suction, for example, its tip may be advanced to an opening of the Turkish saddle 4, or the tip may be advanced to the inside of the Turkish saddle 4.

The driving section 62 includes a vertical (descent-ascent) rod 64 which is advanced or retreated by a servo-motor and a ball screw mechanism as a driving source 63, the suction nozzle 61 is advanceably and retreatably mounted on a tip of the vertical (descent-ascent) rod 64 and biased in the advancing direction by a coil spring 65. The vertical (descent-ascent) rod 64 is placed in parallel with the vertical rod 55 of the spatula 51. The tip of the suction nozzle 61 is located at a succeeding position relative to the tip of the spatula 51 advanced to and pressed against the cut surface F of the skull 3.

The vertical (descent-ascent) rod 64 is advanceably/retreatably journaled at a leading end of a connecting bar 66 extending from the vertical rod 55 so as to cooperatively move in conformity with advance or retreat movement of the horizontal rod 59 of the horizontally driving mechanism 57 for the spatula 51. Accordingly, when the horizontal rod 59 of the horizontally driving mechanism 57 for the spatula 51 is advanced or retreated, the vertical rod 64 is moved in conformity therewith the movement of the vertical rod 55 via the connecting bar 66, and the suction nozzle 61 is thereby moved while keeping a predetermined positional relationship relative to the spatula 51.

A timing of initiation of the suction by actuating the driving section 62 to advance the suction nozzle 61 to or into the Turkish saddle 4 and to initiate the suction is determined, for example, as follows. Since the Turkish saddle 4 which contains the pituitary M is located snout-proximally contiguous to the bottom of the brain enclosure 2, entry of the spatula 51 from the cut surface F into the brain enclosure 2 by the biasing force of the coil spring 56 is detected by a sensor (not shown), and based on the detection of the entry of the spatula 51 into the brain enclosure 2, the driving section 62 is actuated at appropriate timing. After the spatula 51 skipped over the Turkish saddle 4 because it has a size which prevents the spatula 51 from entering the Turkish saddle 4 and allows the spatula 51 to skip over the Turkish saddle 4, on arrival of the suction nozzle 61 at the Turkish saddle 4, the suction nozzle 61 sucks the pituitary M from the Turkish saddle 4.

As described above, the condition of the cut surface F of the fish head W is not restricted to the horizontal condition and may be, for example, a vertical condition, an inclined condition or the like. In these cases (including the case where the cut surface F is in a horizontal condition), the exposing mechanism 50 and the collecting mechanism 60 is in such a condition these mechanisms are rotated by 90 degrees relative to those in the above-described case where the cut surface F is in a horizontal condition. In other words, the spatula 51 of the exposing mechanism 50 is advanced toward the cut surface in a dorsoventral direction of the fish head and then moved in a craniocaudal direction of the fish head while being pressed against the cut surface F, and the suction nozzle 61 of the collecting mechanism 60 is advanced toward the Turkish saddle 4 in a dorsoventral direction of the fish head. In this connection, the driving section 52 includes a dorsoventrally driving mechanism 53 for moving the spatula 51 in a dorsoventral direction of the fish head and a craniocaudally driving mechanism 57 for moving the spatula 51 in a craniocaudal direction after the spatula 51 is pressed against the cut surface F, and the suction nozzle 61 of the collecting mechanism is advanced toward the Turkish saddle 4 in a dorsoventral direction of the fish head.

The fish head discharging mechanism 70 is disposed on the transfer course of the transfer mechanism 20 and corresponding to the stop position subsequent to that of the exposing mechanism 50 and the collecting mechanism 60, as shown in FIG. 6. In the grasping mechanism 30 of the transfer mechanism 20 which has arrived at the fish head discharging mechanism 70, the grasping hands 32 are opened to release the fish head W from the grasping, as shown in FIG. 9. Pushing members (not shown) for pushing the fish head W from right and left sides in the releasing of the fish head W are provided to ensure extraction of the needles 37 of the grasping hands 32 from the fish head W lest the fish head W should not be released from any of the needles 37 of the grasping hands 32 and remain on one of the grasping hands 32. After the grasping hands 32 are released from the fish head W, the fish head W is permitted to fall and discharged by, for example, a belt conveyor (not shown).

Accordingly, when fish heads W are processed by means of the device for collecting useful portions of fish heads according to this embodiment, the processing is as follows. In this connection, each of the mechanisms is operated by a control section (not shown).

As shown in FIGS. 7 and 8, first, a fish head W is introduced between the abutment members 12 and 13 of the posture regulating mechanism 10 with its snout down. Since the abutment member 12 is provided with guide members 14, the fish head W is introduced with its posture regulated to some extent. Further, the introduced fish head W is pressed against the first abutment member 12 by the pressing member 15 biased by the coil spring 16 and also pressed from right and left sides by the two pairs of pressing members 17 biased by the coil springs 18. In consequence, the center plane S of the fish head W is perpendicular to surfaces of the abutment members 12 and 13, and the fish head W is positioned in a predetermined positional relationship according to a shape of the wish head with respect to the plate-like first abutment member 12 which includes the fixed points A and B and which abuts against the ridge line (dorsal outline) of the fish head W and the second abutment member 13 which includes the fixed point C and which abuts against a lower jaw on the ventral outline (the lower outline) of the fish head W. As a result, as described above, since the first abutment member 12 includes the fixed points A and B and abuts against the dorsal outline, and on the other hand, the second abutment member 13 includes the fixed point C and abuts against the lower jaw on the ventral outline, only by introducing each of fish heads W between the abutment members 12 and 13 of the posture regulating mechanism 10 with its snout down, each of the fish heads W is surely positioned even if the fish heads W have different sizes because each of the fish heads W is positioned based on the useful position curve P.

In this condition, the grasping hands 32 of the grasping mechanism 30 are opened to grasp a ventral portion of the fish head W having its posture regulated by the posture regulating mechanism 10, as shown in FIG. 9. In this connection, the fish head W is grasped in such a manner that the distance L between the rotational center of the arms 22 of the transfer mechanism 20 and the useful portion line P of the fish head W is constant. Then, the arm 22 is rotated to transfer the fish head W to the next position, i.e., the position of the cutting mechanism 40. In this connection, the fish head W is transferred in such a manner that the craniocaudal axis of the grasped fish head W is moved along the rotational direction of the arm 22.

When the fish head W arrives at the place where the cutting mechanism 40 is disposed, cutting is performed by means of the cutting blade 41. In this connection, the fish head W which has had its posture regulated is cut in the vicinity of the predetermined useful portion line P substantially along the useful portion line P, as shown in FIG. 5(b). The resulting cut surface F is a (curved) surface T which is mirror-symmetrical with respect to the center plane S. By the cutting, a dorsal portion of the fish head W is removed. In this connection, since the predetermined useful portion line P is a line which is obtained by resting a number of fish heads W having different sizes in a specific posture or a predetermined positional relationship and which passes a pituitary M of each of the fish heads W, by cutting the fish head W in the vicinity of the useful portion line P substantially along the useful portion line P, it is possible to cut the fish head W surely in the vicinity of the pituitary M substantially irrespective of the size of the fish head W.

Thereafter, the arm 22 is rotated to transfer the fish head W to the next position, i.e., the position where the exposing mechanism 50 and the collecting mechanism 60 are disposed, as shown in FIG. 6. In this connection, the fish head W is transferred in such a manner that the craniocaudal axis of the grasped fish head W is moved along the rotational direction of the arm 22.

In the following, description will be given on the exposing mechanism 50 and collecting mechanism 60 in a case where the cut surface F is in a horizontal condition. As described above, however, the condition of the cut surface F is not restricted to the horizontal condition and may be, for example, a vertical condition, an inclined condition or the like.

When the fish head W arrives at the position where the exposing mechanism 50 and the collecting mechanism 60 are disposed, the spatula 51 of the exposing mechanism 50 is advanced by the vertically driving section 53 and elastically pressed against the cut surface F of the skull 3, as shown in FIG. 10. Then, the spatula 51 is moved in a caudal direction by the horizontally driving section 57. The spatula 51 is thereby advanced following the cut surface F of the skull 3 and a wall surface of a brain enclosure 2, and a brain N in the brain enclosure 2 is consequently scratched off to expose a pituitary M from a Turkish saddle 4, as shown in FIGS. 5(c) and 10. In this connection, since the cut surface F is present in the vicinity of the pituitary M, an amount of the brain N as an untargeted portion to be removed is small. This enables the useful portion to be exposed with ease. To sum up, the above-described cutting enables the pituitary M as a useful portion present on the useful portion line P to be exposed with ease.

In the course of the movement of the spatula 51, the suction nozzle 61 is located above the spatula 51 and follows the spatula 51, and when the spatula 51 is moved from the cut surface F of the skull 3 to the brain enclosure 2 and enters the brain enclosure 2 by the biasing force of the coil spring 56, the entry of the spatula 51 into the brain enclosure 2 is detected by, for example, a sensor (not shown), and the suction nozzle 61 is advanced toward the Turkish saddle 4 based on the detection and brought into abutment against or inserted into the Turkish saddle 4 to initiate suction. Further, since the suction nozzle 61 is moved in the caudal direction of the fish head following the movement of the spatula 51, the suction nozzle 61 arrives at the Turkish saddle 4 and sucks the pituitary M from the Turkish saddle 4. In this connection, the pituitary M as a useful portion present on the useful portion line P has surely been exposed owing to the above-described cutting. This enables substantially only the pituitary M as a specific organ to surely be collected. By virtue thereof, only the pituitary M containing no substantial untargeted portion other than the pituitary M can be collected, thereby leading to extremely high efficiency.

After completion of the suction by means of the suction nozzle 61, the spatula 51 and the suction nozzle 61 are returned to the original positions by the driving sections 52 and 62. Then, the arm 22 is rotated to transfer the fish head W to the next position, i.e., the position where the fish head discharge mechanism 70 is disposed, as shown in FIG. 6. At this position, in the grasping mechanism 30 of the transfer mechanism 20, the grasping hands 32 are opened to release the fish head W from the grasping. In this connection, since the fish head W is pushed from right and left sides by the pushing members (not shown), extraction of the needles 37 of the grasping hands 32 from the fish head W is ensured. After the grasping hands 32 are released from the fish head W, the fish head W is permitted to fall and discharged by, for example, a belt conveyor (not shown).

In this manner, the pituitary M is collected from the fish head W. In this connection, the transfer mechanism 20 is provided with the four arms 22. Accordingly, fish heads W can be sequentially grasped and transferred by the arms 22 and subjected to collection treatment. This leads to extremely high efficiency.

In FIG. 11, a device for collecting useful portions of fish heads according to another embodiment of the present invention is shown. This device has basically the same structure as the above-described device, but this device is different from the above-described device in positions of the exposing mechanism 50, the collecting mechanism 60 and the fish head discharging mechanism 70 and in structure of a cutting mechanism 40.

As shown in FIG. 11, with respect to the four stop positions of tips of arms 22 of a transfer mechanism 20, the posture regulating mechanism 10 is disposed corresponding to the first stop position, and the exposing mechanism 50 and the collecting mechanism 60 are disposed corresponding to the next stop position in the rotational direction of the arms 22, and the fish head discharge mechanism 70 is disposed corresponding to the subsequent stop position in the rotational direction of the arms 22. A cutting mechanism 40 is disposed between the stop position for the posture regulating mechanism 10 and the stop position for the exposing mechanism 50 and the collecting mechanism 60, and cutting of a fish head W is performed in the course of transfer of the fish head W from the posture regulating mechanism 10 to the exposing mechanism 50 and the collecting mechanism 60. The cutting mechanism 40 is provided with a cutting blade 45 for cutting the posture-regulated fish head W in the vicinity of the preliminarily determined useful portion line P substantially along the useful portion line P to remove a dorsal portion of the fish head W. As the cutting blade 45, for example, an endless band saw blade of a stationary band saw is employed, and the fish head W grasped by the grasping mechanism 30 is cut while being transferred. In this case, although the resulting cut surface F has a circular arc-shaped cut line as shown in FIG. 11, the cut line may be deemed to be approximately a straight line. Accordingly, the fish head W is cut in the vicinity of the useful portion line P substantially along the useful portion line P. By virtue of this, as in the case of the foregoing embodiment, the fish head W is surely cut in the vicinity of the pituitary M substantially irrespective its size. The other functions and effects are the same as those in the foregoing embodiment.

In the above-described embodiments, each of fish heads are cut in the vicinity of the useful portion line P substantially along the useful portion line P. However, manner of the cutting is not restricted to this. According to a position and properties of a useful portion, each of fish head may be cut along the useful portion line P. The manner of the cutting may appropriately be modified.

For example, in a case where a useful portion is a brain N, each of fish heads is cut along a useful portion line P which passes brains N, and then the brain N is collected by suction by means of, for example, a collecting mechanism equipped with a suction nozzle. In this case, it is preferred that the useful portion line P be so set as to pass as close to dorsal sides of brains N as possible. Also in a case where useful portions are a brain N and a pituitary M, manner of cutting may appropriately be set, for example, a fish head is likewise cut along a useful portion line P which passes brains N, and then both the brain N and the pituitary M are collected together by suction by means of, for example, a collecting mechanism equipped with a suction nozzle.

Further, in the above-described embodiments, each of fish heads is cut along the predetermined useful portion line P or in the vicinity of the predetermined useful portion line P substantially along the useful portion line P. However, manner of the cutting is not restricted thereto. Even if cutting is not based on the useful portion line P, so long as a dorsal portion of a fish head is cut off in such a manner that a brain is exposed from a skull, by pressing a means of an exposing mechanism for scratching off the brain such as a spatula against a cut surface and moving the means in the manner as described above, a pituitary can be exposed with ease because bonding of the brain to the skull is weak and thus the brain is easy-to-remove. It is also thereby possible to attain the object of the present invention.

Moreover, in the above-described embodiments, the transfer mechanism 20 which rotates the arms 22 is of so-called turret type. However, the transfer mechanism 20 is not necessarily restricted to so-called turret type, and may be, for example, a conveyor type which transfers a line of fish heads W. The transfer mechanism 20 may be appropriately altered.

Furthermore, the posture regulating mechanism 10, the cutting mechanism 40, the exposing mechanism 50, the collecting mechanism 60 and the fish head discharging mechanism 70 are not restricted to those described above and, of course, these mechanisms may appropriately be altered.

Further, in the above-described embodiments, the useful portion line P is a specific straight line. However, the useful portion line P is not necessarily restricted thereto and may be a curved line. According to factors such as a kind of fish, a position of a useful portion and the like, the useful portion line P may, of course, be selected variously.

Moreover, in the above-described embodiments, the present invention is applied to heads of salmon as fish heads W. However, the fish heads W are not restricted to heads of salmon, and of course, the present invention may be applied to various kinds of fish other than salmon.

Furthermore, in the above-described embodiments, the fixed abutment members 12 and 13 are used as the curved contact surfaces and the pressing members 17 which are left-right symmetrically moved by the coil springs 18 to place the center plane S of a fish head W in a predetermined position are used. However, the present invention is not restricted to this, and of course, the pressing members 17 may be fixed curved surfaces.

Still further, in the above-described embodiments, examples for carrying out the present invention are shown as the automatic devices using controlled motors and the various kinds of mechanisms. However, the present invention is not necessarily restricted thereto. Of course, an embodiment of the present invention may be constituted by introducing a fish head between a group of a plurality of curved surfaces which contain the fish head therebetween and rest the fish head thereon, and then cutting the fish head W along the useful portion line P to expose a brain enclosure, and manually extracting a pituitary.

FIGS. 12 and 13 show several states of fish heads W cut in accordance with the method for collecting useful portions of fish heads or by the device for collecting useful portions of fish heads according to the embodiments of the present invention. FIG. 12 shows schematic views of the fish heads W subsequent to the cutting which are viewed from the front, and FIG. 13 shows schematic views of the fish heads W subsequent to the cutting which are viewed from a side.

States of the cut surface F of the fish head W cut in accordance with the method for collecting useful portions of fish heads or by the device for collecting useful portions of fish heads according to the present invention include a state of the cut surface F which slopes down to the left when viewed from the front of the fish head W as shown in FIG. 12(a), a state of the cut surface F which is substantially horizontal when viewed from the front of the fish head W as shown in FIG. 12(b), and a state of the cut surface F which slopes down to the right when viewed from the front of the fish head W as shown in FIG. 12(c).

Further, the states of the cut surface F of the fish head W subsequent to the cutting include a state of the cut surface F which slopes down to the left (toward the rear of the fish head W) when viewed from a side of the fish head W subsequent to the cutting as shown in FIG. 13(a), and a state of the cut surface F which slopes down to the right (toward the front of the fish head W) when viewed from the side of the fish head W as shown in FIG. 13(b).

In any case of those shown in FIGS. 12 and 13, after the brain N is scratched off from the brain enclosure 2, the pituitary M can be collected by the suction nozzle 61 as shown in each of the Figs.

FIGS. 14 and 15 show the method or device for collecting useful portions of fish heads according to another embodiment of the present invention. The method or device for collecting useful portions of fish heads according to this embodiment has the same constitution as the method or device for collecting useful portions of fish heads according to the above-described embodiment, except that the device is provided with a suction nozzle 61a for collecting the brain N and the pituitary M en masse, and thus the method or device comprises no step of exposing the useful portion or a useful portion exposing mechanism.

The suction nozzle 61a has a sucker-like suction mouth 80 which covers the brain enclosure 2, and the sucking mouth 80 includes a flexible neck 80a and a sticking section 80b having sticking properties.

When cutting is carried out by the method or device for collecting useful portions of fish heads according to this embodiment, states of the cut surface F of the fish head W include a state of the cut surface F which slopes down to the left when viewed from the front of the fish head W as shown in FIG. 14(a), a state of the cut surface F which is substantially horizontal when viewed from the front of the fish head W as shown in FIG. 14(b), and a state of the cut surface F which slopes down to the right when viewed from the front of the fish head W as shown in FIG. 14(c). In any case of the states of the cut surface F, the flexible (universal) neck 80a flexibly conforms to the cut surface F, and the sticking section 80b of the suction mouth 80 consequently sticks to the cut surface F in such a manner that the sticking section 80b covers the brain enclosure 2, and accordingly, the brain N and the pituitary M can be collected en masse through the suction mouth 80.

Further, according to the method or device for collecting useful portions of fish heads of this embodiment, the states of the cut surface F of the fish head W include a state of the cut surface F which slopes down to the left (toward the rear of the fish head W) when viewed from a side of the fish head W subsequent to the cutting as shown in FIG. 15(a), and a state of the cut surface F which slopes down to the right (toward the front of the fish head W) when viewed from the side of the fish head W as shown in FIG. 15(b). In any case of the states of the cut surface F, the flexible (universal) neck 80a flexibly conforms to the cut surface F, and the sticking section 80b of the suction mouth 80 consequently sticks to the cut surface F in such a manner that the sticking section 80b covers the brain enclosure 2, and accordingly, the brain N and the pituitary M can be collected en masse through the suction mouth 80.

BRIEF DESCRIPTION OF THE DRAWINGS

FIG. 1(a) is a plan view and FIG. 1(b) is a perspective front view.

FIG. 8(a) is a front view and FIG. 8(b) is a side view.

FIG. 12 is schematic views of the states of a fish head when viewed from the front of the fish head subsequent to the cutting.

FIG. 13 is schematic views of the states of a fish head when viewed from a side of the fish head subsequent to the cutting.

NOTE ON REFERENCE LETTERS AND NUMBERS

Figure 1:
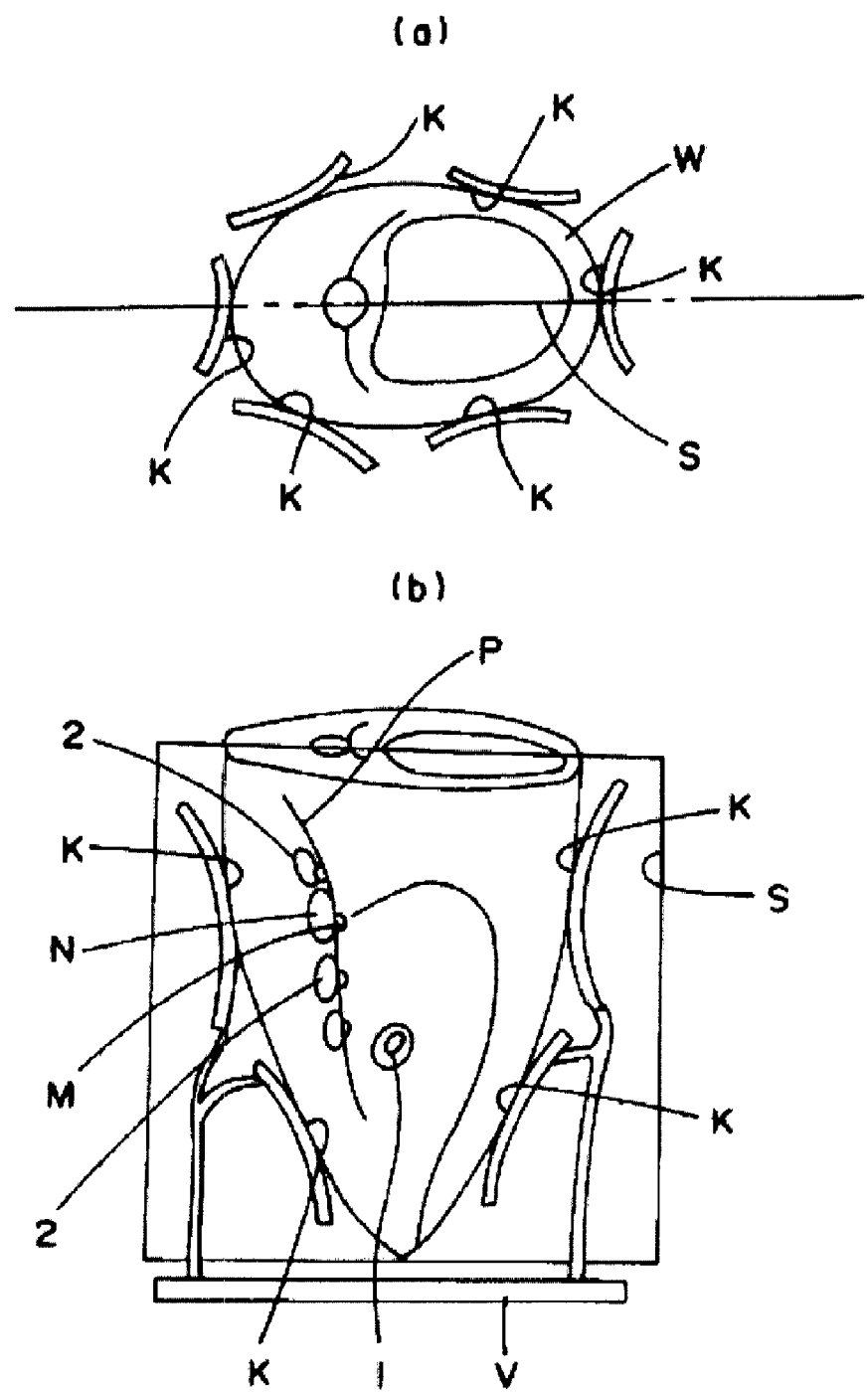
FIG. 1 is illustrations showing principle for determining the useful portion line P of fish heads in the present invention.
Figure 2:
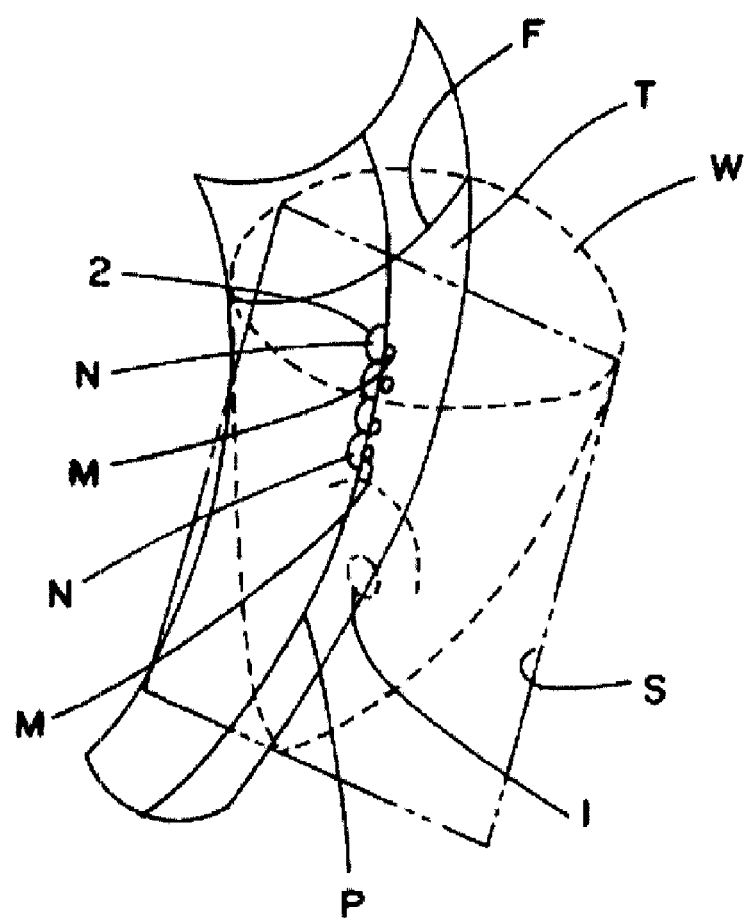
FIG. 2 is an illustration showing principle of the method for collecting useful portions of fish heads of the present invention.
Figure 3:
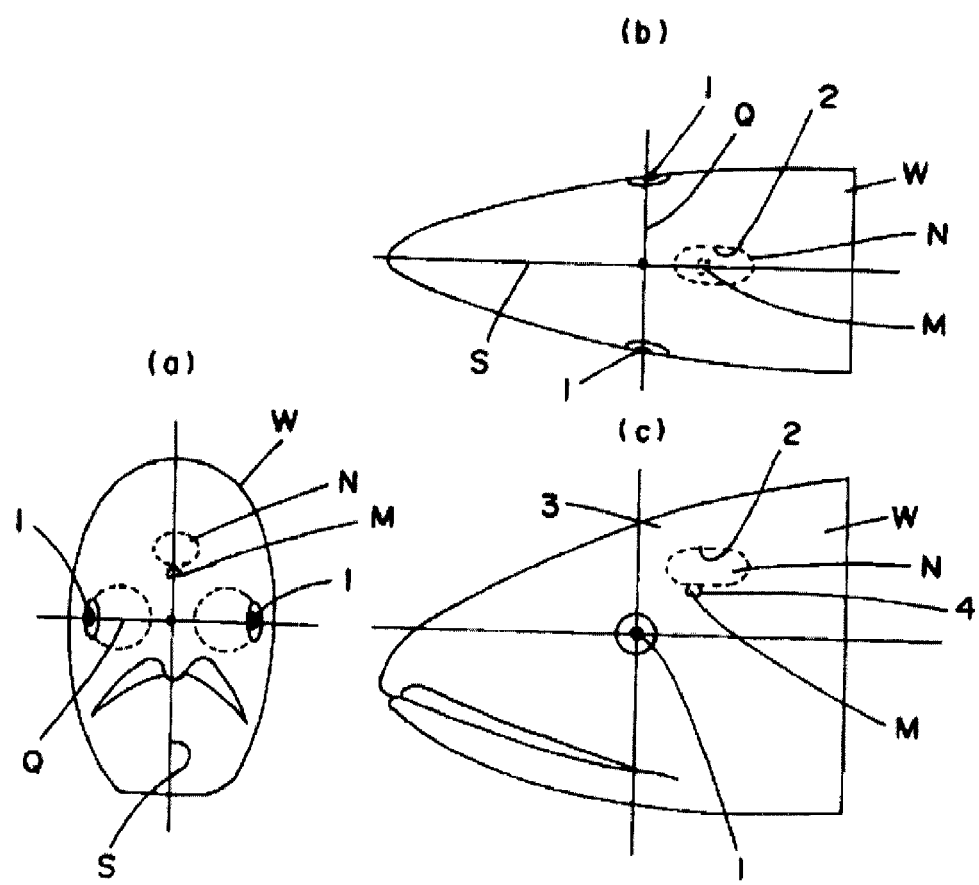
FIG. 3 is illustrations showing positional relationship of a useful portion of a fish head to be processed by the method or device for collecting useful portions of fish head according to each of the embodiments of the present invention.
Figure 4:
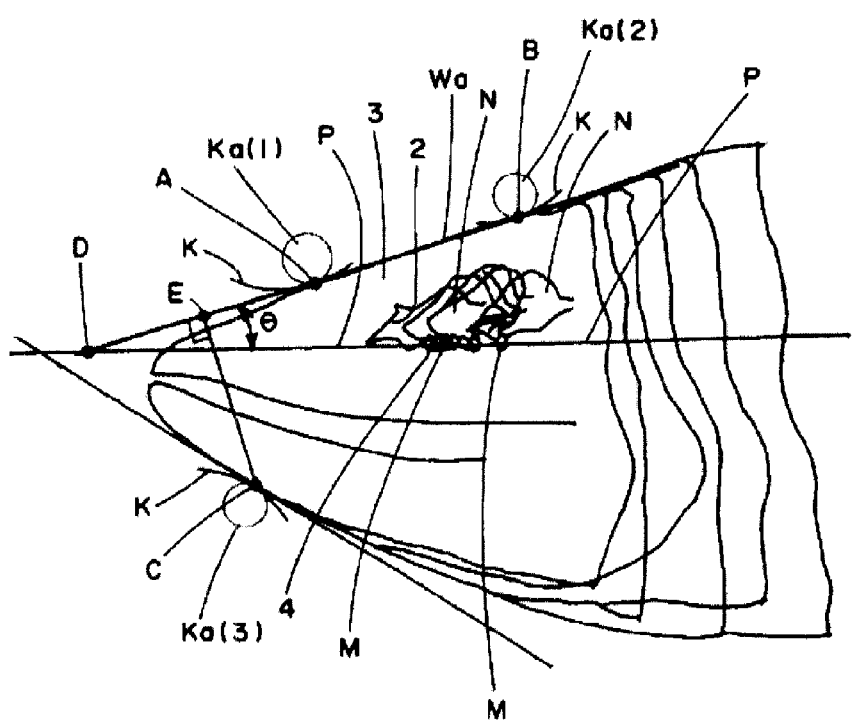
FIG. 4 is a sectional view showing positional relationships of useful portions of fish heads to be processed by the method or device for collecting useful portions of fish head according to each of the embodiments of the present invention.
Figure 5:
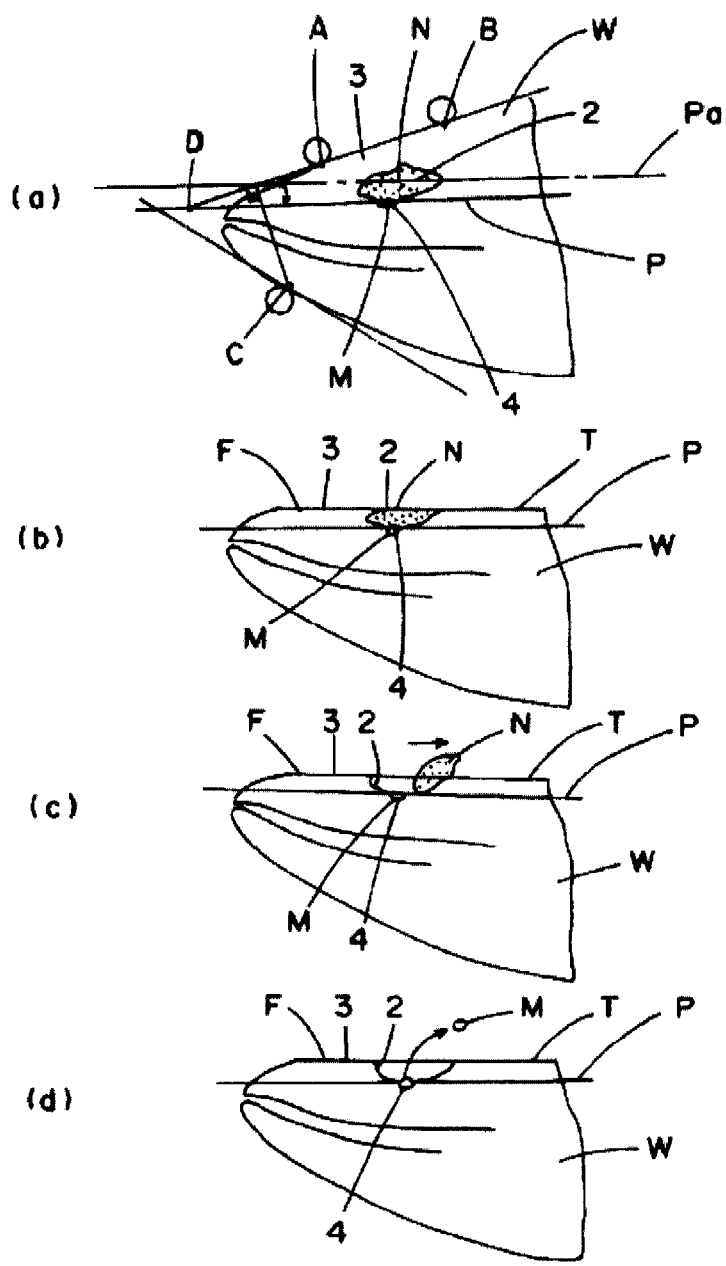
FIG. 5 is a process chart showing the method for collecting useful portions of fish heads according to the embodiment of the present invention.
Figure 6:
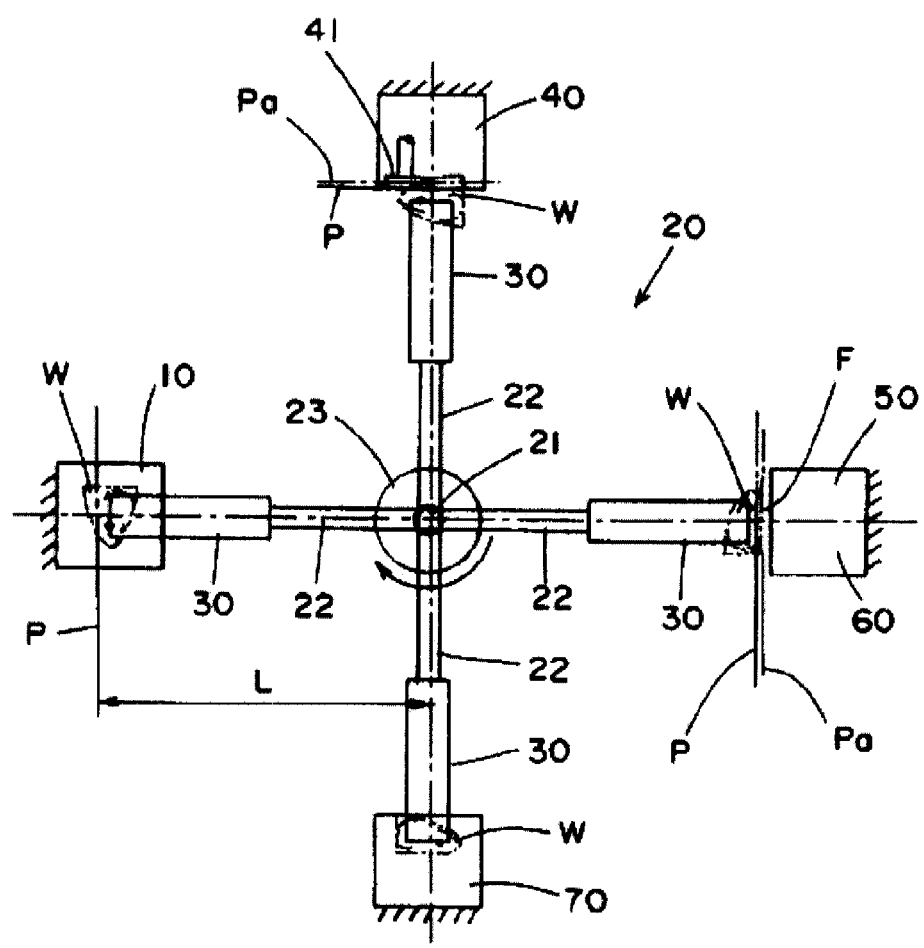
FIG. 6 is an overall view showing the device for collecting useful portions of fish heads according to the embodiment of the present invention.
Figure 7:
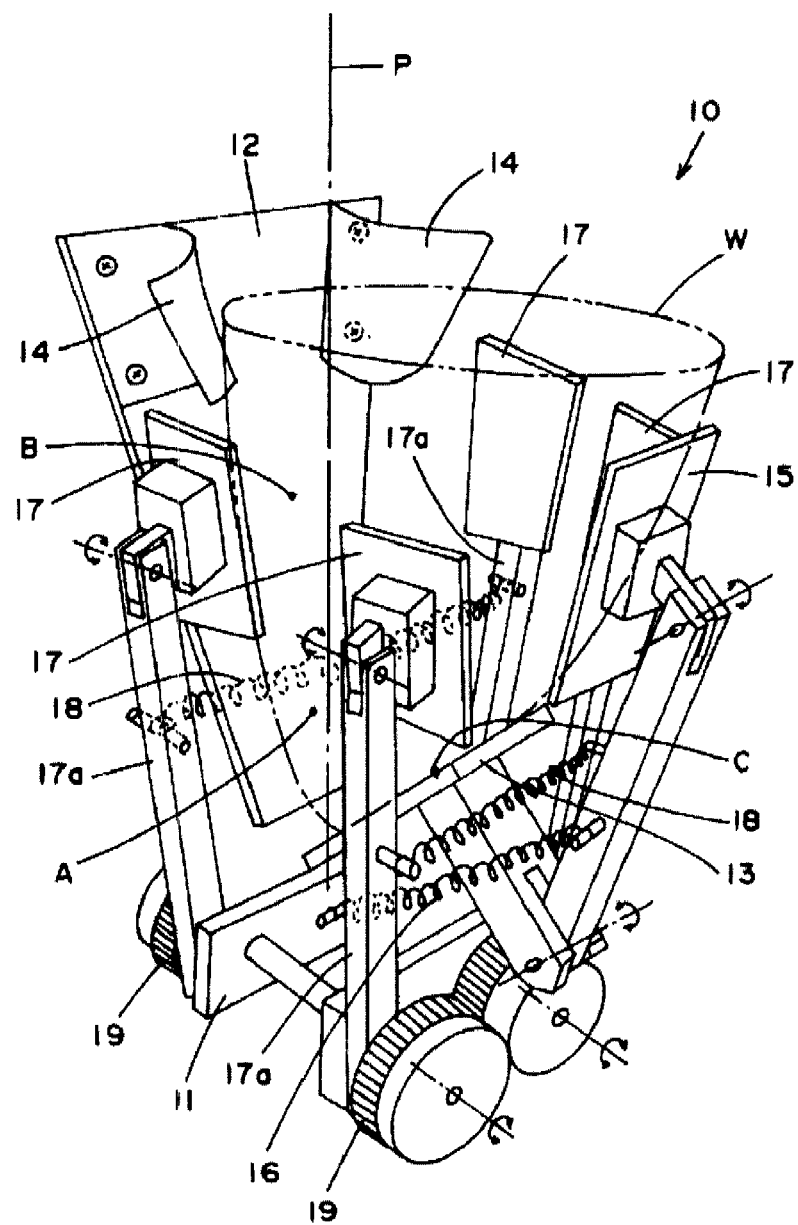
FIG. 7 is a perspective view showing the posture regulating mechanism in the device for collecting useful portions of fish heads according to each of the embodiments of the present invention.
Figure 8:
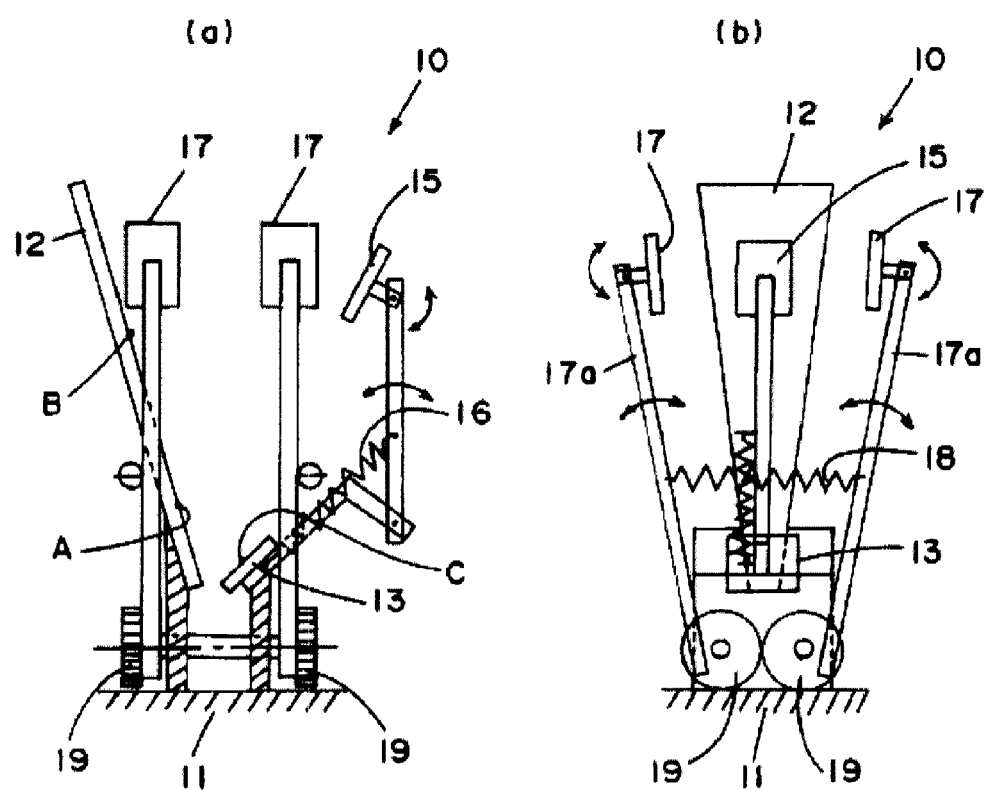
FIG. 8 shows the posture regulating mechanism in the device for collecting useful portions of fish heads according to each of the embodiments of the present invention.
Figure 9:
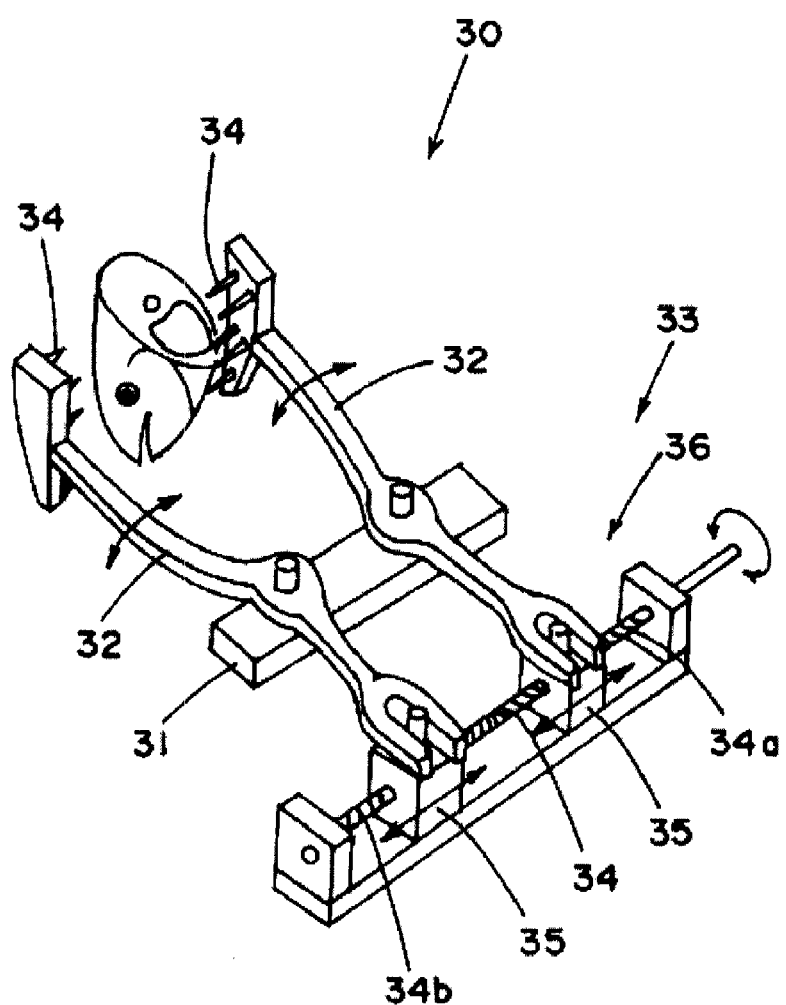
FIG. 9 is a perspective view showing the grasping mechanism of the transfer mechanism in the device for collecting useful portions of fish heads according to each of the embodiments of the present invention.
Figure 10:
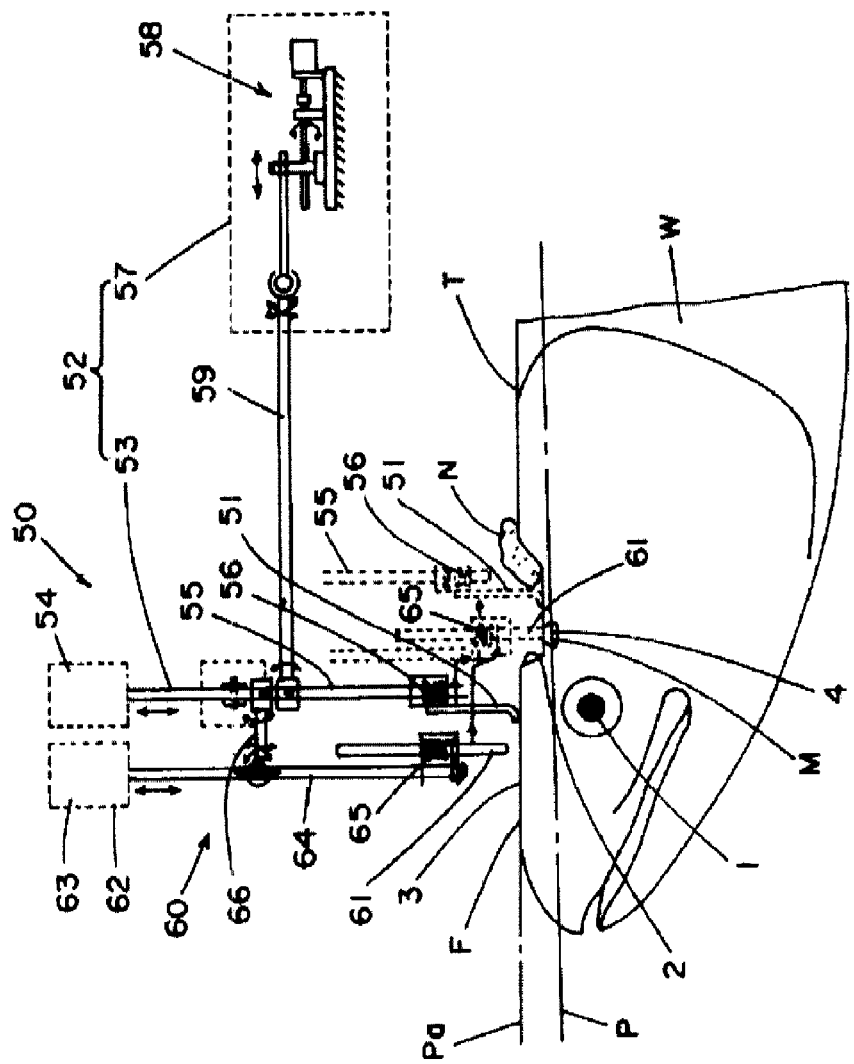
FIG. 10 is an illustration showing the exposing mechanism and collecting mechanism in the device for collecting useful portions of fish heads according to the embodiments of the present invention.
Figure 11:
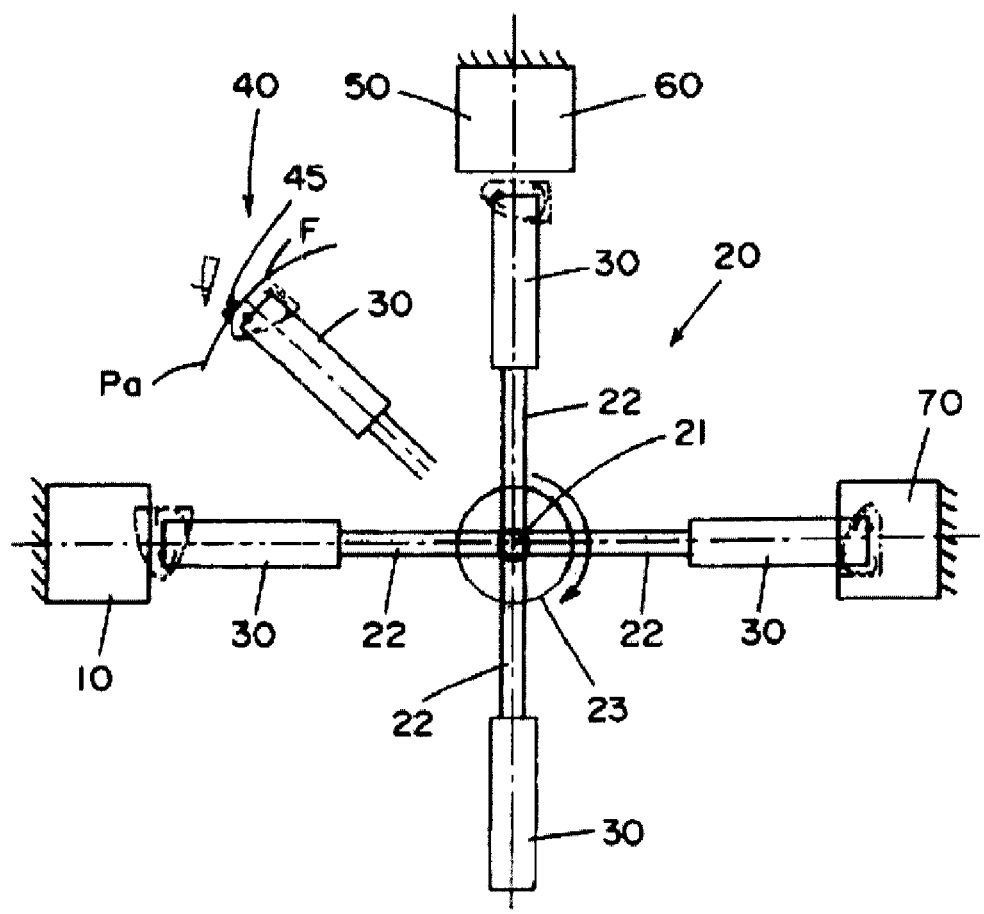
FIG. 11 is an overall view showing the device for collecting useful portions of fish heads according to another embodiment of the present invention.
Figure 12:
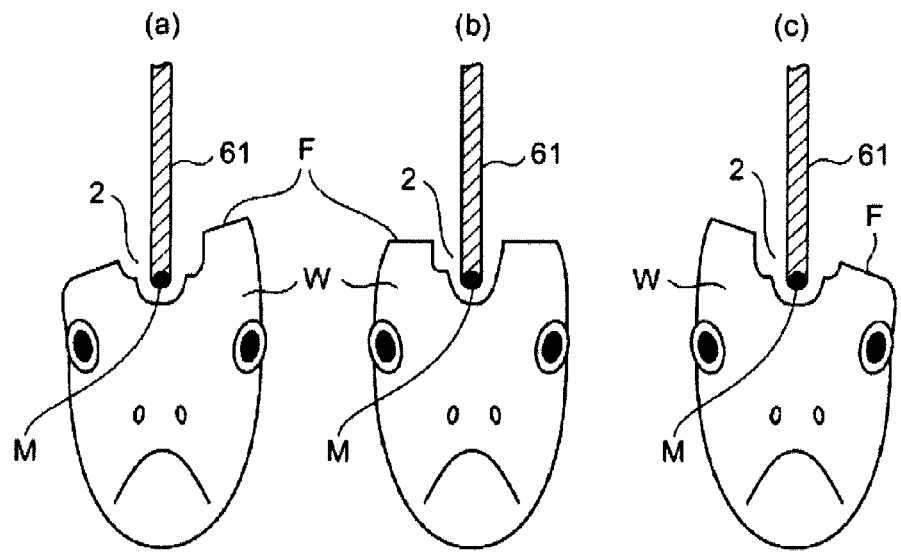
FIG. 12 shows states of a fish head cut by the method or device for collecting useful portions of fish heads according to each of the embodiments of the present invention.
Figure 13:
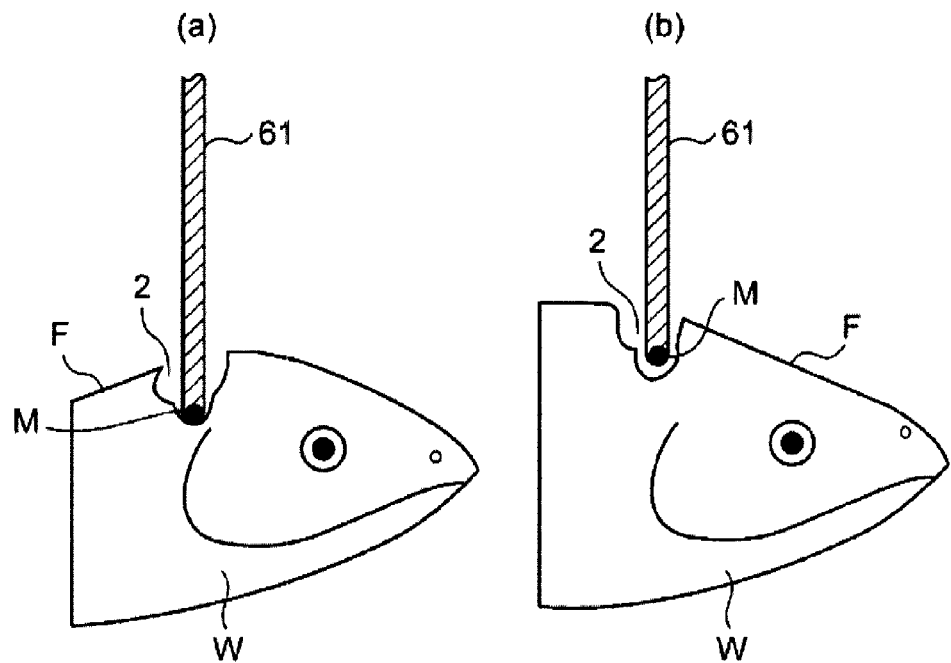
FIG. 13 shows states of a fish head cut by the method or device for collecting useful portions of fish heads according to each of the embodiments of the present invention.
Figure 14:
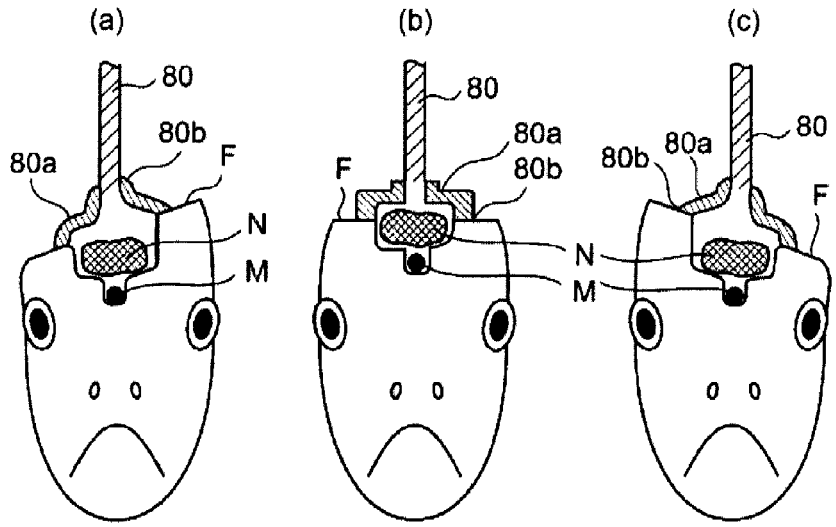
FIG. 14 is a schematic view showing the method or device for collecting useful portions of fish heads according to another embodiment of the present invention.
Figure 15:
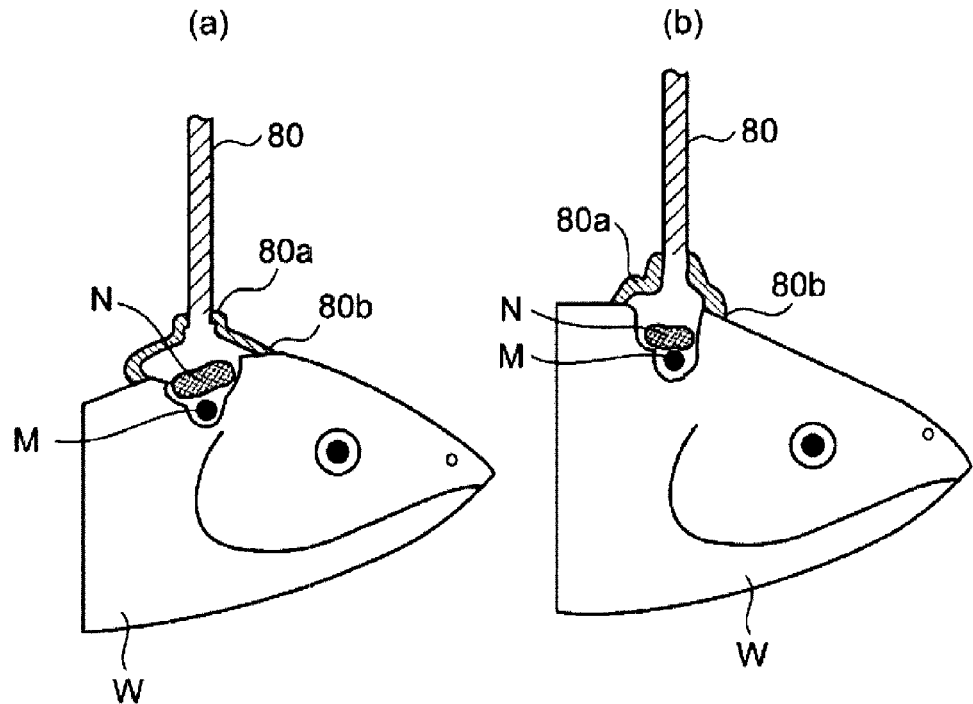
FIG. 15 is a schematic view showing the method or device for collecting useful portions of fish heads according to the other embodiment of the present invention.
Figure 16:
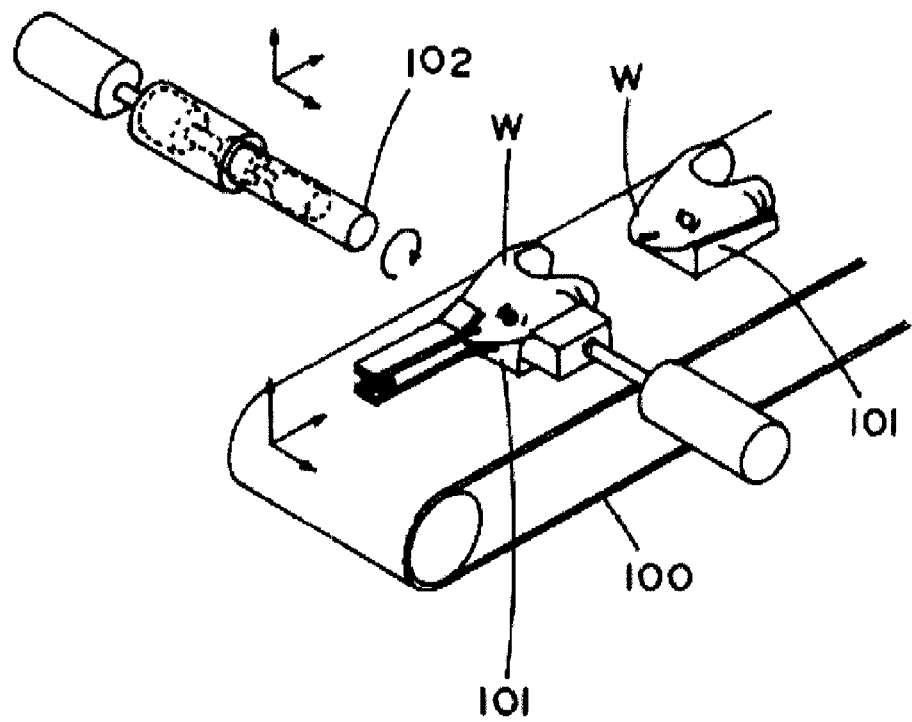
FIG. 16 is an illustration showing an example of a conventional device for collecting useful portions of fish heads.

W: fish head
N: brain
M: pituitary
1: eye
2: brain enclosure
3: skull
4: Turkish saddle
Q: eye-eye line
S: center plane
P: useful portion line
Pa: line
K: curved surface
Ka: small circle
F: cut surface
T: (curved) surface
10: posture regulating mechanism
11: base
12: first abutment member
13: second abutment member
15: pressing plate
17: pressing member
20: transfer mechanism
21: rotating shaft
22: arm
23: driving section
30: grasping mechanism
32: grasping hand
33: driving mechanism
40: cutting mechanism
41: cutting blade
45: cutting blade
50: exposing mechanism
51: spatula
52: driving section
53: vertically driving section
56: coil spring
57: horizontally driving section
60: collecting mechanism
61: suction nozzle
62: driving section
65: coil spring
70: fish head discharging mechanism

The invention claimed is:

1. A method for collecting useful portions of fish heads, the method collecting specific useful portions from a number of fish heads of the same kind of fish and of roughly the same shape, the method comprising:
preliminarily determining a useful portion line which passes useful portions of a number of fish heads having different sizes when the fish heads are rested in a specific posture;
resting the a fish head to be processed in the specific posture;
cutting the rested fish head along the preliminarily determined useful portion line or cutting the rested fish head in the vicinity of the preliminarily determined useful portion line substantially along the useful portion line to expose the useful portion(s); and
subsequently collecting the exposed useful portion.

2. The method for collecting useful portions of fish heads according to claim 1, wherein if the useful portion is still covered with an untargeted portion after the cutting, the untargeted portion is removed to expose the useful portion.

3. The method for collecting useful portions of fish heads according to claim 1, wherein the useful portion of the fish head is a specific organ of the fish head which is present on a center plane that is orthogonal to an eye-eye line segment connecting both eyes of the fish head and that passes the middle of the eye-eye line segment.

4. The method for collecting useful portions of fish heads according to claim 3, wherein the specific organ is at least one of a brain and a pituitary (hypophysis).

5. The method for collecting useful portions of fish heads according to claim 4, wherein in the determination of the useful portion line, when each of a number of fish heads having different sizes is placed in such a manner that the center plane of each of the fish heads is located at the same position and a craniocaudal axis of each of the fish heads is substantially equally oriented, a group of a plurality of curved surfaces, which are fixed relative to the center plane and contact with all the fish heads to rest each of the fish heads thereon, are selected, and a contour of a brain enclosure of each of the fish heads which have been brought in contact with and rested on the selected group of curved surfaces is recorded to obtain a group of the contours of the brain enclosures, and a line which passes through the group of the contours of the brain enclosures and contained in the center plane is determined as the useful portion line.

6. The method for collecting useful portions of fish heads according to claim 5, wherein the useful portion line is a straight line.

7. The method for collecting useful portions of fish heads according to claim 5, wherein when the kind of fish is salmon, the useful portion line is a straight line at an angle of $\theta=16\pm5$ degrees to a straight line passing two specific points determined on a ridge line of the fish head.

8. The method for collecting useful portions of fish heads according to claim 7, wherein when the kind of fish is salmon, and when as parts of the group of a plurality of curved surfaces, which are fixed relative to the center plane and contact with all the fish heads to rest each of the fish heads thereon, the following three fixed points A, B and C are set in the center plane in such a manner that the fixed point A is located at a snout-proximal position on the ridge line at an upper outline of the fish head, and the fixed point B is located on the ridge line at the upper outline of the fish head and 70 mm±10 mm apart from the fixed point A in a caudal direction, and the fixed point C is so located on a lower outline of the fish head that when a point D is so set on a straight line $W_a$ passing the two fixed points A and B as to be a snout-proximal symmetrical point of the fixed point B with respect to the fixed point A as a center of symmetry, and a foot of the perpendicular drawn from the fixed point C to the straight line $W_a$ is present at the midpoint E between the fixed point A and the symmetrical point D, and the fixed point C is located 55 mm±5 mm perpendicularly apart from the straight line $W_a$ passing the fixed points A and B and on the lower outline of the fish head, the useful portion is a straight line which is at an angle of $\theta=16\pm5$ degrees to the straight line $W_a$ passing the fixed points A and B and which passes the fixed point D.

9. The method for collecting useful portions of fish heads according to claim 4, wherein the cutting is performed in such a manner that the cut surface is a (curved) surface which is mirror-symmetrical with respect to the center plane.

10. A device for collecting useful portions of fish heads, the device collecting specific useful portions from a number of fish heads of the same kind of fish and of roughly the same shape, the device comprising:
   a posture regulating mechanism for regulating a posture of a fish head to be processed based on a preliminarily determined useful portion line which passes useful portions of a number of fish heads having different sizes when the fish heads are rested in a specific posture, thereby holding the fish head in the specific posture;
   a cutting mechanism for cutting the posture-regulated fish head along the preliminarily determined useful portion line or cutting the posture-regulated fish head in the vicinity of the preliminarily determined useful portion line substantially along the useful portion line to expose the useful portions; and
   a collecting mechanism for collecting a useful portion of the fish head which is exposed by the cutting and which is present on the useful portion curve.

11. The device for collecting useful portions of fish heads according to claim 10, comprising an exposing mechanism for removing an untargeted portion from the fish head subsequent to the cutting to thereby expose the useful portion.

12. The device for collecting useful portions of fish heads according to claim 11, wherein the device comprises a transfer mechanism which is provided with grasping mechanisms each for grasping the posture-regulated fish head in the posture regulating mechanism and which takes out the fish head from the posture regulating mechanism and transfers the fish head in such a condition that the fish head is grasped by the grasping mechanism, and wherein the cutting mechanism, the exposing mechanism, and the collecting mechanism are disposed on a transfer course of the transfer mechanism.

13. The device for collecting useful portions of fish heads according to claim 11, wherein the useful portion of the fish head is a pituitary which is present on the center plane that is orthogonal to an eye-eye line segment connecting both eyes of the fish head and that passes the middle of the eye-eye line segment and which is present in a Turkish saddle located in a skull and dorsal-proximally contiguous to a brain; and
   wherein the cutting mechanism is provided with a cutting blade for cutting the posture-regulated fish head in the vicinity of the preliminarily determined useful portion curve substantially along the useful portion curve to remove a dorsal portion of the fish head in such a manner that the cut surface is a (curved) surface which is mirror-symmetrical with respect to the center plane, and the exposing mechanism is for removing an untargeted portion from the fish head after the cutting to expose the pituitary, and the collecting mechanism is for collecting the pituitary exposed by the exposing mechanism; and
   wherein the exposing mechanism includes a spatula which is advanced in a dorsoventral direction of the fish head toward the cut surface of the fish head and thereby elastically pressed against the cut surface and which is moved in a snout-to-tail direction of the fish head while being elastically pressed against the cut surface to scratch off a brain attached to a skull and to thereby expose the pituitary in a Turkish saddle in the skull, and a driving section which advances and horizontally moves the spatula; and
   wherein the collecting mechanism includes a suction nozzle which is advanced toward the Turkish saddle to suck the pituitary exposed from the Turkish saddle, and a driving section which advances the suction nozzle.

14. The device for collecting useful portions of fish heads according to claim 11, wherein the useful portion of the fish head is a pituitary which is present on the center plane that is orthogonal to an eye-eye line segment connecting both eyes of the fish head and that passes the middle of the eye-eye line segment and which is present in a Turkish saddle located in a skull and dorsal-proximally contiguous to a brain; and
   wherein the device further comprises a transfer mechanism; and
   wherein the transfer mechanism is provided with grasping mechanisms each for grasping the posture-regulated fish head in the posture regulating mechanism and takes out the fish head from the posture regulating mechanism and transfers the fish head in such a condition that the fish head is grasped by the grasping mechanism, the cutting mechanism is disposed on a transfer course of the transfer mechanism and is provided with a cutting blade for cutting the posture-regulated fish head in the vicinity of the preliminarily determined useful portion curve substantially along the useful portion curve to remove a dorsal portion of the fish head in such a manner that the cut surface is a (curved) surface mirror-symmetrical with respect to the center plane, and the exposing mechanism is disposed on the transfer course of the transfer mechanism and is for removing an untargeted portion from the fish head after the cutting to expose the pituitary, and the collecting mechanism is disposed on the transfer course of the transfer mechanism and is for collecting the pituitary exposed by the exposing mechanism; and
   wherein the exposing mechanism includes a spatula which is advanced in a dorsoventral direction of the fish head toward the cut surface of the fish head transferred and stopped by the transfer mechanism and which is thereby elastically pressed against the cut surface and which is moved in a snout-to-tail-direction of the fish head while being elastically pressed against the cut surface to scratch off a brain attached to a skull and to thereby expose the pituitary in a Turkish saddle in the skull, and a driving section which advances and horizontally moves the spatula; and
   wherein the collecting mechanism includes a suction nozzle which is advanced toward the Turkish saddle to suck a pituitary exposed from the Turkish saddle, and a driving section which advances the suction nozzle.

15. The device for collecting useful portions of fish heads according to claim 10, wherein the device comprises a transfer mechanism which is provided with grasping mechanisms each for grasping the posture-regulated fish head in the posture regulating mechanism and which takes out the fish head from the posture regulating mechanism and transfers the fish head in such a condition that the fish head is grasped by the grasping mechanism; and wherein the cutting mechanism and the collecting mechanism are disposed on a transfer course of the transfer mechanism.

16. The device for collecting useful portions of fish heads according to claim 10, wherein the useful portion of the fish head is a specific organ present on a center plane which is orthogonal to an eye-eye line segment connecting both eyes of the fish head and passes the middle of the eye-eye line segment.

17. The device for collecting useful portions of fish heads according to claim 16, wherein the specific organ is at least one of a brain and a pituitary (hypophysis).

18. The device for collecting useful portions of fish heads according to claim 17, wherein in the determination of the useful portion line, when each of a number of fish heads having different sizes is placed in such a manner that the center plane of each of the fish heads is located at the same position and a craniocaudal axis of each of the fish heads is substantially equally oriented, a group of a plurality of curved surfaces, which are fixed relative to the center plane and contact with all the fish heads to rest each of the fish heads thereon, are selected, and a contour of a brain enclosure of each of the fish heads brought in contact with and rested on the selected group of curved surfaces is recorded to obtain a group of the contours of the brain enclosures, and a line which passes through the group of the contours of the brain enclosures and contained in the center plane is determined as the useful portion line; and
the posture regulating mechanism includes a base and a plurality of abutment members which are mounted on the base and which respectively correspond to the group of curved surfaces on which each of the fish heads abuts, thereby holding the fish head.

19. The device for collecting useful portions of fish heads according to claim 18, wherein the useful portion line is a straight line.

20. The device for collecting useful portions of fish heads according to claim 18, wherein when the kind of fish is salmon, the useful portion line is a straight line at an angle of $\theta=16\pm5$ degrees to a straight line passing two specific points determined on a ridge line of the fish head.

21. The device for collecting useful portions of fish heads according to claim 20, wherein when the kind of fish is salmon, and when as parts of the group of a plurality of curved surfaces, which are fixed relative to the center plane and contact with all the fish heads to rest each of the fish heads thereon, the following three fixed points A, B and C are set in the center plane in such a manner that the fixed point A is located at a snout-proximal position on the ridge line at an upper outline of the fish head, and the fixed point B is located on the ridge line at the upper outline of the fish head and 70 mm±10 mm apart from the fixed point A in a caudal direction, and the fixed point C is so located on a lower outline of the fish head that when a point D is so set on a straight line $W_a$ passing the two fixed points A and B as to be a snout-proximal symmetrical point of the fixed point B with respect to the fixed point A as a center of symmetry, and a foot of the perpendicular drawn from the fixed point C to the straight line $W_a$ is present at the midpoint E between the fixed point A and the symmetrical point D, and the fixed point C is located 55 mm±5 mm perpendicularly apart from the straight line $W_a$ passing the fixed points A and B and on the lower outline of the fish head, the useful portion is a straight line which is at an angle of $\theta=16\pm5$ degrees to the straight line $W_a$ passing the fixed points A and B and which passes the fixed point D.

22. The device for collecting useful portions of fish heads according to claim 16, wherein the cutting of the fish head by the cutting mechanism is performed in such a manner that the cut surface is a (curved) surface which is mirror-symmetrical with respect to the center plane.

23. The device for collecting useful portions of fish heads according to claim 10, wherein the device comprises a transfer mechanism which is provided with grasping mechanisms each for grasping a ventral portion at a lower portion of the posture-regulated fish head in the posture regulating mechanism and which takes out the fish head from the posture regulating mechanism and transfers the fish head in such a condition that the fish head is grasped by the grasping mechanism; and
wherein the transfer mechanism includes arms which have a rotating shaft perpendicular to their longitudinal directions at their proximal ends and which are rotated about the rotating shaft, and a driving section for rotating the arms; and
wherein the grasping mechanisms are each so constructed as to grasp the ventral portion at a lower portion of the fish head and are respectively mounted on the distal ends of the arms so as to transfer the fish head in such a manner that the craniocaudal axis of the grasped fish head is moved along the rotational direction of the arms.

24. A device for collecting useful portions of fish heads, said device collecting specific useful portions from a number of fish heads of the same kind of fish and of roughly the same shape, wherein the useful portion of the fish head is a pituitary which is present on a center plane that is orthogonal to an eye-eye line segment connecting both eyes and that passes the middle of the eye-eye line segment and which is present in a Turkish saddle located in a skull and dorsal-proximally contiguous to a brain, the device comprising:
a cutting mechanism provided with a cutting blade for cutting the fish head to remove a dorsal portion of the fish head in such a manner that the brain is exposed from the skull;
an exposing mechanism for removing the brain from the fish head subsequent to the cutting to expose the pituitary; and
a collecting mechanism for collecting the pituitary exposed by the exposing mechanism.

25. The device for collecting useful portions of fish heads according to claim 24, wherein the exposing mechanism includes a spatula which is advanced in a dorsoventral direction of the fish head toward the cut surface of the fish head and thereby elastically pressed against the cut surface and which is moved in a snout-to-tail direction of the fish head while being elastically pressed against the cut surface to scratch off a brain attached to a skull and to thereby expose the pituitary in a Turkish saddle in the skull, and a driving section which advances and horizontally moves the spatula; and
wherein the collecting mechanism includes a suction nozzle which is advanced toward the Turkish saddle to suck the pituitary exposed from the Turkish saddle, and a driving section which advances the suction nozzle.

26. A device for collecting useful portions of fish heads, the device comprising:
a cutting mechanism for cutting a fish head;
an exposing mechanism for exposing a useful portion of the fish head; and
a collecting mechanism for collecting the useful portion exposed by the exposing mechanism; the exposing mechanism including a spatula which is moved while being pressed against a cut surface of the fish head, and a driving section which advances and moves the spatula; and the collecting mechanism including a suction nozzle for sucking the useful portion, and a driving section which advances the suction nozzle.

27. The device for collecting useful portions of fish heads according to claim 26, wherein the useful portion is a pituitary which is present on a center plane that is orthogonal to an eye-eye line segment connecting both eyes of the fish head and that passes the middle of the eye-eye line segment and which is present in a Turkish saddle located in a skull and dorsal-proximally contiguous to a brain.

28. The device for collecting useful portions of fish heads according to claim 26, wherein the spatula is advanced in a dorsoventral direction of the fish head toward the cut surface of the fish head and thereby elastically pressed against the cut surface and moved in a snout-to-tail direction of the fish head while being elastically pressed against the cut surface to scratch off a brain attached to a brain enclosure and to thereby expose the pituitary in a Turkish saddle.

29. The device for collecting useful portions of fish heads according to claim 27, wherein the suction nozzle is advanced toward the Turkish saddle to suck the pituitary exposed from the Turkish saddle.

30. The device for collecting useful portions of fish heads according to claim 26, wherein the device comprises a cutting mechanism provided with a cutting blade for cutting the fish head to remove a dorsal portion of the fish head in such a manner that the brain is exposed from the skull of the fish head.

* * * * *